(12) United States Patent
Tagiri et al.

(10) Patent No.: US 7,548,499 B2
(45) Date of Patent: Jun. 16, 2009

(54) OFFSET AMOUNT MEASURING METHOD AND APPARATUS

(75) Inventors: Takao Tagiri, Yamanashi (JP); Seiro Oshima, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 780 days.

(21) Appl. No.: 11/301,245

(22) Filed: Dec. 13, 2005

(65) Prior Publication Data

US 2006/0133244 A1 Jun. 22, 2006

(30) Foreign Application Priority Data

Dec. 17, 2004 (JP) .............................. 2004-366888

(51) Int. Cl.
*G11B 7/00* (2006.01)
(52) U.S. Cl. ................. 369/53.14; 369/53.22
(58) Field of Classification Search ........................ None
See application file for complete search history.

(56) References Cited

U.S. PATENT DOCUMENTS

| 7,215,634 | B2 * | 5/2007 | Van Woudenberg | ...... | 369/275.3 |
| 2002/0110068 | A1 * | 8/2002 | Araki et al. | .............. | 369/53.24 |
| 2004/0196776 | A1 * | 10/2004 | Yoshida et al. | ........... | 369/275.1 |

FOREIGN PATENT DOCUMENTS

| JP | 2000-311346 | 11/2000 |
| JP | 2001-23237 | 1/2001 |
| JP | 2003-242653 | * 8/2003 | ...................... 7/45 |

\* cited by examiner

*Primary Examiner*—Joseph H Feild
*Assistant Examiner*—Christopher R Lamb
(74) *Attorney, Agent, or Firm*—Nixon & Vanderhye P.C.

(57) ABSTRACT

An offset amount measuring method is provided with: a recording process for measurement (i) of recording information for measurement, into a recording track in the L0 layer, by a predetermined section, from a measurement reference position, and of (ii) recording the information for measurement, into a recording track in the L1 layer, by the predetermined section, from or toward a measurement correspondence position, which is associated with the measurement reference position by the pre-format address; a first detecting process of detecting a border of a first recorded area in which the information for measurement is recorded and a first unrecorded area in the first recording track, on the basis of a difference in reflectance between the first recorded area and the first unrecorded area; a second detecting process of detecting a second border position in the recording track in the L1 layer, on the basis of a difference in reflectance; and a determining process of determining the offset amount, on the basis of the detected first and second border positions. Moreover, it is also provided with a judging process of judging whether or not the determined offset amount is within tolerance with respect to the first offset amount set in advance for offset countermeasures.

18 Claims, 19 Drawing Sheets

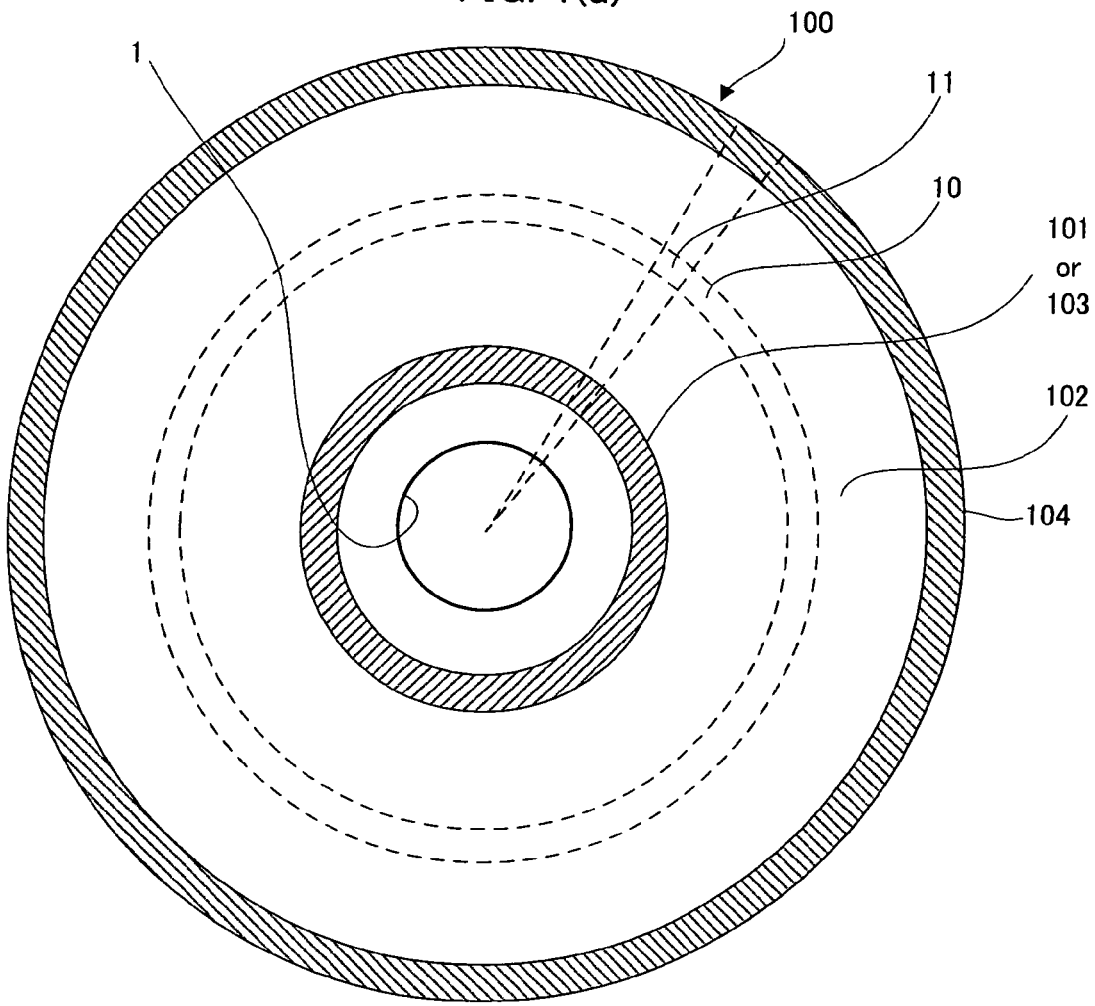
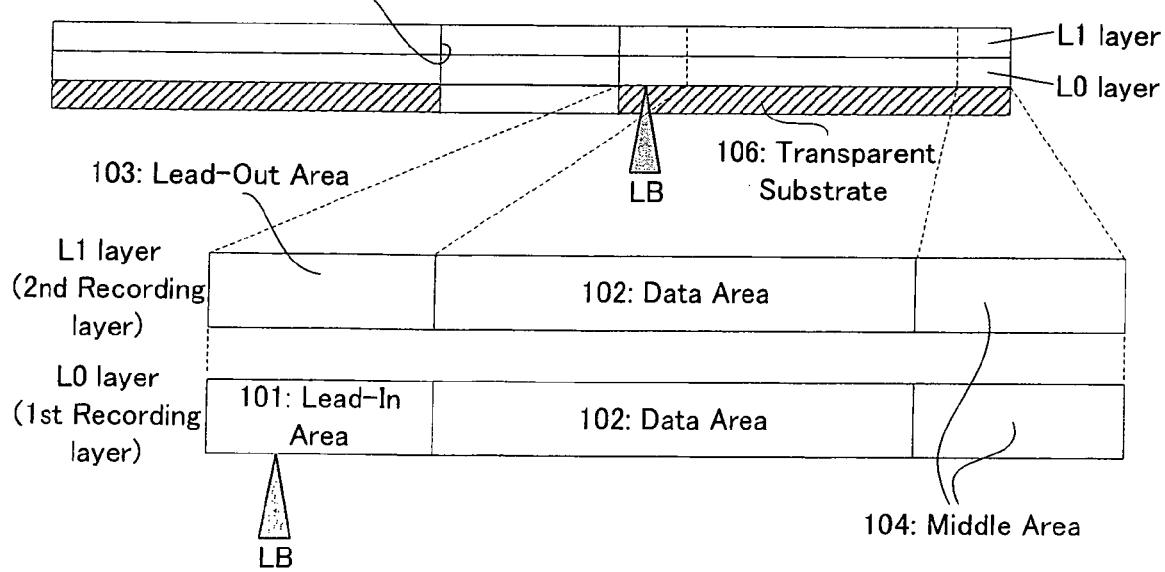

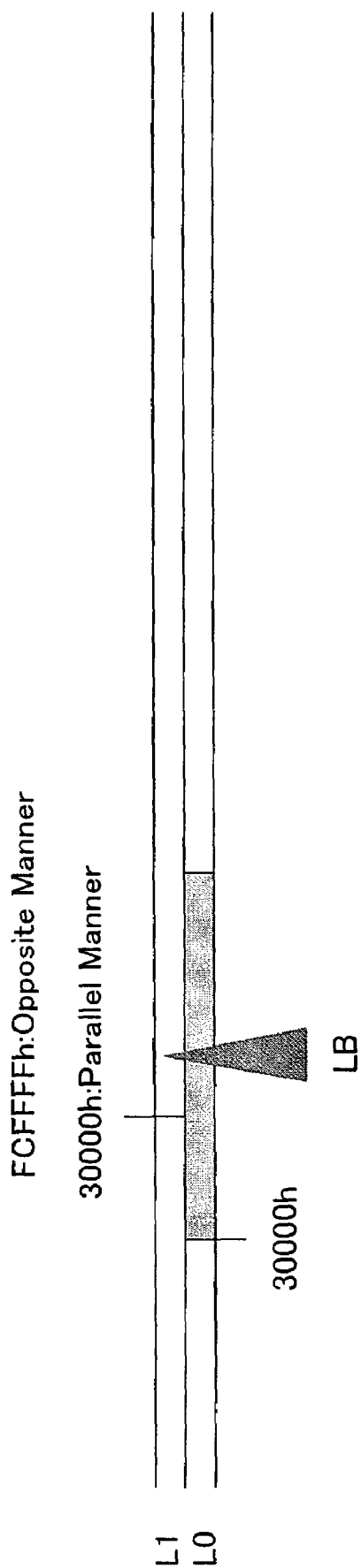

OFFSET AMOUNT MEASURING METHOD AND APPARATUS

BACKGROUND OF THE INVENTION

1. Field of the Invention

The present invention relates to an offset amount measuring method of and apparatus for measuring an offset amount which is a shift amount in the radial direction between radial positions in a plurality of recording layers, in an information recording medium, such as a DVD and a CD (Compact Disc) having a two-layer structure or multilayer structure, for example.

2. Description of the Related Art

In an information recording medium, such as a CD-ROM (Compact Disc-Read Only Memory), a CD-R (Compact Disc-Recordable), and a DVD-ROM, for example, as described in Japanese Patent Application Laid Open NO. 2000-311346 and NO. 2001-23237, etc., there is also developed an information recording medium, such as a multilayer type or dual layer type optical disc, in which a plurality of recording layers are laminated or pasted on the same substrate. Then, on an information recording apparatus, such as a DVD recorder, for performing the recording with respect to the dual layer type, i.e., two-layer type, optical disc, laser light for recording is focused or condensed on a recording layer located on the front (i.e. on the closer side to an optical pickup) as viewed from the irradiation side of the laser light (hereinafter referred to as an "L0 layer", as occasion demands) to thereby record information into the L0 layer in an irreversible change recording method by heat or a rewritable method. Moreover, the laser light is focused or condensed on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer.

In such a two-layer type optical disc, if the data is recorded into the L1 layer, it is necessary to irradiate the laser light through the L0 layer. In this case, the record data may be recorded in the L0 layer, or may not be recorded. As described above, the recording state in the L0 layer is not necessarily standardized, which causes a change in the state of the laser light with which the L1 layer is irradiated. Thus, a method is also considered by the present inventors or the like in which the L0 layer is made in a recorded state to thereby properly record the record data into the L1 layer.

However, in preparing such a two-layer type information recording medium, the L0 layer and the L1 layer are formed by different stampas or cutting machines and are pasted in the end. Thus, in the L0 layer and the L1 layer, there arises an eccentricity due to a pasting error, to a greater or lesser extent. Alternatively, since the L0 layer and the L1 layer are formed by different stampas or cutting machines, there arises deviation in a track pitch in each recording layer, to a greater or lesser extent.

In particular, even if the above-mentioned eccentricity and the deviation are caused, it is unclear to what extent they are. Moreover, it is also unclear whether or not there are countermeasures to the eccentricity and the deviation, and whether or not the countermeasures are good if some countermeasures are taken. In addition, even if it is tried to measure the eccentricity and the deviation with respect to the information recording medium before the record information is recorded by a user, it is unclear where is the address part targeted for the measurement in an unrecorded state. In other words, practically, it is hardly possible or impossible to measure the eccentricity and the deviation, and to judge verification of whether or not the countermeasures are good and whether or not the countermeasures taken are effective, if some countermeasures are further taken.

As a result, there is such a problem that the eccentricity and the deviation cause a shift or deviation in a position in another recording area of the L1 layer which is associated with one recording layer of the L0 layer by position information, such as a pre-format address, for example, so that the another recording area of the L1 layer is not necessarily irradiated with the laser light through one recording area which is in the recorded state in the L0 layer.

SUMMARY OF THE INVENTION

It is therefore a first object of the present invention to provide an offset amount measuring apparatus and an offset amount measuring method which enable the measurement of an offset amount between a plurality of recording layers in an information recording medium having the plurality of recording layers, for example.

The above object of the present invention can be achieved by an offset amount measuring method of measuring an offset amount, which is a shift amount in a radial direction between radial positions on first and second recording tracks, the radial positions being associated with each other by a pre-format address (e.g. a sector number or sector address) given in advance to the first and second recording tracks, in an information recording medium provided with at least: a disc-shaped first recording layer in which the first recording track is formed to record therein record information; and a disc-shaped second recording layer in which the second recording track is formed to record therein the record information in a direction equal to or opposite to that in the first recording track of the first recording layer (i.e. in a parallel manner or an opposite manner), the offset amount measuring method provided with: a recording process for measurement (i) of recording information for measurement, into the first recording track, by a predetermined section or by a predetermined length, from one measurement reference position which is specified by the pre-format address, and (ii) of recording the information for measurement, into the second recording track, by the predetermined section or by the predetermined length, from or toward a measurement correspondence position, which is associated with the one measurement reference position by the pre-format address; a first detecting process of detecting a first border position which is a border of a first recorded area in which the information for measurement is recorded and a first unrecorded area in which the information for measurement is unrecorded in the first recording track, on the basis of a difference in reflectance between the first recorded area and the first unrecorded area, with a central axis of the information recording medium as a reference; a second detecting process of detecting a second border position which is a border of a second recorded area in which the information for measurement is recorded and a second unrecorded area in which the information for measurement is unrecorded in the second recording track, on the basis of a difference in reflectance between the second recorded area and the second unrecorded area, with the central axis as a reference; and a determining process of determining the offset amount, on the basis of the detected first and second border positions.

According to the offset amount measuring method of the present invention, the information recording medium which is the measurement target or subject thereof is a two-layer type or multilayer type DVD or optical disc, having the first and second recording layers formed on one surface of a disc-shaped substrate, for example. In the first recording layer, the record information, such as audio information, video information, and content information, can be recorded along the first recording track provided with grooves, for example. In the second recording layer, the record information, such as audio information, video information, and content information, can be recorded along the first recording track provided with grooves, for example. By virtue of such construction, the substrate, the first recording layer, and the second recording layer are irradiated in this order with laser light for recording or reproduction. More specifically, particularly, the first recording track may be directed from one of the inner and outer circumferential sides of the above-mentioned substrate, to the other side, and the second recording track may be also directed from one side to the other side. In other words, in the two-layer type or multilayer type information recording medium, continuous recording in the "parallel manner (i.e. parallel track manner)" can be performed in which the recording tracks are directed in the same direction in the two recording layers. Alternatively, as opposed to the first track, the second recording track may be directed from the other side to the one side. In other words, in the two-layer type or multilayer type information recording medium, continuous recording in the "opposite manner (i.e. opposite track manner)" can be performed in which the recording tracks are directed in the opposite direction in the two recording layers.

In such an information recording medium, the radial positions or positions in the radial direction on the first and second recording tracks are associated with each other by the pre-format address. For example, in the parallel manner, the radial positions with the same address value (e.g. the radial positions with the same sector number) are associated with each other. Alternatively, in the opposite manner, the radial positions with the complement address values (e.g. the radial positions with the sector numbers in a complement relationship) are associated with each other. Then, identically, or in other words, if there is no eccentricity between the first and second recording layers and there is no deviation between the first and recording track pitches, these associated radial positions are overlapped without a shift or offset, as viewed from a vertical direction of the first and second recording layers in the disc-shaped information recording medium as a horizontal. In other words, identically, the offset amount is zero. In practice, however, the eccentricity and the deviation are caused, to a greater or lesser extent, because there is a pasting error in the recording layers and because different stampas and cutting machines are used, or for similar reasons.

In the present invention, at first, by the recording process for measurement, the information for measurement is recorded into the first recording track, by a predetermined section (e.g. a predetermined section which is defined by two points indicated by sector number) or by a predetermined length (e.g. a predetermined length on a radial direction), for example, so as to spread it over a predetermined number of sectors, from one measurement reference position which is specified by the pre-format address. Before or after this, the information for measurement is recorded into the second recording track, by the predetermined section or by the pre-determined length, from a measurement correspondence position or toward the measurement correspondence position, which is associated with the one measurement reference position by the pre-format address. The "measurement correspondence position, which is associated by the pre-format address" of the present invention herein is the facing radial position to the measurement reference position (i.e. a position with the same address value, such as the sector number, for example) in the parallel manner, and the facing radial position to the measurement reference position (i.e. a position with the address value, such as the sector number, in the complement relationship) in the opposite manner. Moreover, the term "facing" in the present invention may mean that the radial positions are substantially equal, even including a predetermined margin or the like.

After that, by the first detecting process, the first border position which is the border of the first recorded area and the first unrecorded area in the first recording track (e.g. a border nearer the outer or inner circumference of the first recorded area, or a border of the both), is detected on the basis of a difference in reflectance between the first recorded area and the first unrecorded area, with a central axis of the information recording medium as a reference. Normally, in the first recorded area, the reflectance is reduced due to a physical or chemical change, such as a phase change and a shape change in the recording layer, as compared to the first unrecorded area, so that the first border position can be measured, relatively easily and accurately. Before or after this, by the second detecting process, the second border position which is the border of the second recorded area and the second unrecorded area in the second recording track (e.g. a border nearer the outer or inner circumference of the second recorded area, or a border of the both), is detected on the basis of a difference in reflectance between the second recorded area and the second unrecorded area, with the central axis as a reference. Even in this case, normally, in the second recorded area, the reflectance is reduced, as compared to the second unrecorded area, so that the second border position can be measured, relatively easily and accurately.

After that, by the determining process, the offset amount is determined, on the basis of the first and second border positions detected in the above manner. In other words, the offset amount can be detected by comparing both the first border position and the second border position at the outer circumference side or at the inner circumference side of the areas in which the information for measurement is recorded. Such determination is performed by a mathematical operation process by using a processing apparatus, such as a CPU (Central Processing Unit), for example.

Therefore, before a user uses the information recording medium; namely, before the record information is recorded into a data area or a user data area, it is possible to measure the offset amount, relatively easily and accurately, which is generated in accordance with the eccentricity between the first and second recording tracks and the deviation of the first and second track pitches, which are supposed to be caused to a greater or lesser extent because there is a pasting error in the recording layers and because different stampas and different cutting machines are used, or for similar reasons.

Thus, for example, in the information recording medium in the parallel manner, if such construction that a second place which is a reference of the pre-format address to indicate a start position of a data area in the second recording track is located on an outer circumferential side, by a first offset amount set in advance, from a first place which is a reference of the pre-format address to indicate a start position of a data area in the first recording track, is adopted for countermeasures to the above-mentioned eccentricity or deviation, it is possible to actually measure the first offset amount, and moreover, it is possible to judge whether or not the first offset amount is within expected tolerance. Alternatively, in the information recording medium in the opposite manner, if such construction that a second place which is a reference of the pre-format address to indicate a start position of a data area in the second recording track is located on an inner circumferential side, by a first offset amount set in advance, from a first place which is a reference of the pre-format address to indicate an end position of a data area in the first recording track, is adopted for countermeasures to the above-mentioned eccentricity or deviation, it is possible to actually measure the first offset amount, and moreover, it is possible to judge whether or not the first offset amount is within expected tolerance. If such countermeasures are taken, it is possible to perform proper recording, near the start position of the recording area located on the inner circumferential side of the second recording layer, with an optimum recording laser power in the case where the record data is recorded into the second recording layer through the first recording layer in the state that the record data is already recorded, for example.

Consequently, according to the offset amount measuring method of the present invention, even if there arises a shift or offset in accordance with the eccentricity and the deviation described above, it is possible to clear to what extent the shift or offset is, by measuring the offset amount, and moreover, it is also possible to clear whether or not the countermeasures to the eccentricity and the deviation are required. In addition, it is also possible to clear whether or not the countermeasures are good if some countermeasures are taken, such as the verification of the offset amount which is performed on purpose.

In one aspect of the offset amount measuring method of the present invention, the first and second detecting processes detect the first and second border positions, respectively, by a light microscope which is located opposite to the first and second recording layers and which is fixed with respect to the central axis while the information recording medium is rotated around the central axis.

According to this aspect, it is possible to detect both the first and second border positions, highly accurately, by observing them with the light microscope and directly reading them. By this, it is possible to measure the offset amount, highly accurately.

In another aspect of the offset amount measuring method of the present invention, the first and second detecting processes detect coordinates based on the central axis of a plurality of points which exist in the first and second border positions, which is specified by the pre-format address, by using a two-dimensional length measuring apparatus which is located opposite to the first and second recording layers and which can be displaced in parallel with the first and second recording layers.

According to this aspect, the coordinates of three points on the first recording track, which constitute the first border position in the first recording layer, and the coordinates of three points on the second recording track, which constitute the second border position in the second recording layer, are measured by using the two-dimensional length measuring apparatus or a two-dimensional measuring system. Then, if the central coordinates in each of the first and second recording layers and the radial position of each measured point are calculated on the basis of the plurality of coordinates as being the measurement results of the plurality of points, it is possible to measure the offset amount, from a difference in the radial positions calculated in the first and second recording layers.

Alternatively, in another aspect of the offset amount measuring method of the present invention, a second place which is a reference of the pre-format address to indicate a start position of a data area in which the record information can be recorded in the second recording track is located on an outer circumferential side, by at least a first offset amount set in advance, from a first place which is a reference of the pre-format address to indicate a start position of a data area in which the record information can be recorded in the first recording track, and the offset amount measuring method is further provided with a judging process of judging whether or not the determined offset amount is within tolerance set in advance with respect to the first offset amount.

According to this aspect, even if there is the eccentricity between the first and second recording layers or the deviation of the first and second recording track pitches, as described above, with respect to the information recording medium in the "parallel manner", the second place is offset from the first place on the outer circumferential side, by the first offset amount, as the countermeasure to record the record data into the second recording layer through the first recording layer in the state that the record data is already recorded. In other words, the information recording medium is designed such that the second place which indicates the start position of the data area with a pre-format address, such as the sector number, of "30000h", for example, is located on the outer circumferential side, at least by the first offset amount, from the first place which indicates the start position of the data area with the sector number of "30000h", for example. The "first offset amount" herein is a reference value which corresponds to the length in the radial direction, determined to locate the most inner circumferential position of the recording area in the second recording layer, on the outer circumferential side from the most inner circumferential position of the recording area in the first recording layer. Specifically, it is equal to or greater than the maximum value of the eccentricity caused by the pasting error in the first and second recording layers. Incidentally, the first offset amount is indicated as the length (μm) in the radial direction of an optical disc. It may be convertible to the number of sectors or the number of ECC blocks, or may be directly indicated by the number of sectors or the number of ECC blocks which is the predetermined unit of the address. As a result, it is possible to perform the proper recording with an optimum recording laser power in the case where the record data is recorded into the second recording layer through the first recording layer in the state that the record data is already recorded, near the start position of the recording area located on the inner circumferential side in the second recording layer. The recording laser power does not need to be changed near the start position of the recording area located on the inner circumferential side in the second recording layer, and it is only necessary to record the record data in accordance with the pre-format address, such as the sector number. Thus, there is also such an advantage that the recording procedure itself is simplified. In addition, even if the recorded data is reproduced, it is possible to obtain good reproduction features (e.g. an asymmetry value, a jitter value, degree of modulation, a reproduction error rate, etc.).

After the determining process is performed to the information recording medium constructed in the above manner, it is judged by the judging process whether or not the determined offset amount is within the tolerance set in advance for the first offset amount. Thus, it is possible to automatically or semi-automatically verify whether or not the above-mentioned countermeasure to give the first offset amount is properly taken, by a comparison operation process by using a processing apparatus, such as a CPU. Incidentally, in this case, it is also possible to compare the determined offset amount with the known first offset amount, by an artificial device, such as by hand or visual observation.

Alternatively, in another aspect of the offset amount measuring method of the present invention, a second place which is a reference of the pre-format address to indicate a start position of a data area in which the record information can be recorded in the second recording track is located on an inner circumferential side, by at least a first offset amount set in advance, from a first place which is a reference of the pre-format address to indicate an end position of a data area in which the record information can be recorded in the first recording track, and the offset amount measuring method is further provided with a judging process of judging whether or not the determined offset amount is within tolerance set in advance with respect to the first offset amount.

According to this aspect, even if there is the eccentricity between the first and second recording layers or the deviation of the first and second recording track pitches, as described above, with respect to the information recording medium in the "opposite manner", the second place is offset from the first place on the inner circumferential side, by the first offset amount, as the countermeasure to record the record data into the second recording layer through the first recording layer in the state that the record data is already recorded. In other words, the information recording medium is designed such that the second place which indicates the start position of the data area with a pre-format address, such as the sector number, of "E50000h", for example, is located on the inner circumferential side, at least by the first offset amount, from the first place which indicates the end position of the data area with the sector number of "1AFFFFh", for example. As a result, it is possible to perform the proper recording with an optimum recording laser power in the case where the record data is recorded into the second recording layer through the first recording layer in the state that the record data is already recorded, near the start position of the recording area located on the outer circumferential side in the second recording layer. The recording laser power does not need to be changed near the start position of the recording area located on the outer circumferential side in the second recording layer, and it is only necessary to record the record data in accordance with the pre-format address, such as the sector number. Thus, there is also such an advantage that the recording procedure itself is simplified. In addition, even if the recorded data is reproduced, it is possible to obtain good reproduction features.

After the determining process is performed to the information recording medium constructed in the above manner, it is judged by the judging process whether or not the determined offset amount is within the tolerance set in advance for the first offset amount. Thus, it is possible to automatically or semi-automatically verify whether or not the above-mentioned countermeasure to give the first offset amount is properly carried out, by a comparison operation process with a processing apparatus, such as a CPU. Incidentally, in this case, it is also possible to compare the determined offset amount with the known first offset amount, by an artificial device, such as by hand or visual observation.

Incidentally, in the above-mentioned two aspects, if the countermeasure to set the first offset amount is taken, not only the maximum value of the eccentricity caused by the pasting error may be considered, but also the maximum value of the deviation related to the track caused by the use of different stampas and different cutting machines may be considered (as "eccentricity clearance"), to thereby set the first offset amount. Moreover, the first offset amount and the second offset amount may be set in view of a predetermined radius of the vicinity of the edge of the beam on the first recording layer, in the case where the second recording layer is irradiated with the focused beam through the first recording layer (e.g. as "irradiation range clearance").

In the above-mentioned aspect in which the first offset amount is set, the first offset amount may be set to be equal to or greater than an eccentric amount in the first recording layer and the second recording layer.

By virtue of such construction, it is possible to perform the proper recording, with little or no influence of the eccentricity in the first and second recording layers, near the start position of the recording area located on the inner or outer circumferential side of the second recording layer, with an optimum recording laser power in the case where the record data is recorded into the second recording layer through the first recording layer in the state that the record data is already recorded. More specifically, if the maximum value of the eccentricity in the first recording layer is 40 μm and the maximum value of the eccentricity in the second recording layer is 70 μm, the first offset amount is the sum of the eccentricity in the first and second recording layers, i.e., 110 μm (=40+70). In addition, by setting the upper limit value of the first offset amount to 200 μm, it is possible to comply with the standard of a two-layer DVD-ROM in the parallel manner. In particular, by the judging process, it is possible to certainly verify the first offset amount set in the above manner.

Alternatively, in the above-mentioned aspect in which the first offset amount is set, the first recording track and the second recording track are constructed such that a ratio of a track pitch of the second recording track to a track pitch of the first recording track has a predetermined value less than 1.

By virtue of such construction, the ratio of the track pitch of the second recording track to the track pitch of the first recording track preferably has a predetermined value less than 1, for example. Thus, it is possible to perform adjustment such that an outer circumferential end which is recordable in the second recording layer is located on the inner circumferential side by a predetermined amount from an outer circumferential end which is recordable in the first recording layer. The "track pitch" herein is an interval in the radial direction of the first or second recording track of the disc-shaped information recording medium (incidentally, its unit is (μm/track)). The "predetermined amount" herein is a reference value which corresponds to the length in the radial direction, determined to locate the most inner circumferential position of the recording area in the second recording layer, on the inner circumferential side from the most inner circumferential position of the recording area in the first recording layer. Specifically, it is equal to or greater than the maximum value of the eccentricity caused by the pasting error in the first and second recording layers, for example. In particular, by the judging process, it is possible to certainly verify the first offset amount set in the above manner.

Alternatively, in the above-mentioned aspect in which the first offset amount is set, the first recording track and the second recording track may be constructed such that a difference of a track pitch of the second recording track to a track pitch of the first recording track has a predetermined negative value.

By virtue of such construction, the difference of the track pitch of the second recording track to the track pitch of the first recording track preferably has a predetermined negative value, for example. Thus, it is possible to perform adjustment such that an outer circumferential end which is recordable in the second recording layer is located on the inner circumferential side by a predetermined amount from an outer circumferential end which is recordable in the first recording layer. As a result, the laser light hardly penetrates or does not penetrate at all the first recording layer in the unrecorded state, in the recording in the second recording layer, wherein the same effect is received as the case where the above-mentioned ratio of the track pitches is adjusted. In particular, by the judging process, it is possible to certainly verify the first offset amount set in the above manner.

In the above-mentioned aspect related to the ratio or difference of the track pitches, the ratio or the difference of the track pitch of the second recording track may be set such that an outer circumferential end of the data area in the second recording track is located on an inner circumferential side, by at least the first offset amount, from an outer circumferential end of the data area in the first recording track.

By virtue of such construction, it is possible to locate the outer circumferential end which is recordable in the second recording layer, on the inner circumferential side, at least by the first offset amount, from the outer circumferential end which is recordable in the first recording layer. Thus, it is possible to omit the calculation of the second offset amount, performed by an information recording apparatus. The information recording apparatus may only perform a recording operation in accordance with the pre-format address, such as the sector number. Thus, it is possible to more easily realize that the laser light hardly penetrates or does not penetrate at all the first recording layer in the recorded state, in the recording in the second recording layer. In particular, by the judging process, it is possible to certainly verify the first offset amount set in the above manner.

In the above-mentioned aspect related to the ratio or difference of the track pitches, the information recording medium may be further provided with a first management area in which information about the ratio or a difference is recorded.

By virtue of such construction, it is possible to obtain the information about the ratio or difference, more easily and quickly, from the first management area disposed in the recording area, by using an information recording apparatus. Then, it is possible to certainly verify the first offset amount set in the above manner, on the basis of the information obtained from the first management area, in the judging process. Alternatively, it is possible to certainly perform recording and reproduction operations with respect to the information recording medium, on the basis of the information obtained from the first management area, on the information recording apparatus or information reproducing apparatus, for example.

In the above-mentioned aspect related to the ratio or difference of the track pitches, the information recording medium may be further provided with a second management area in which information about the first offset amount is recorded.

By virtue of such construction, it is possible to obtain the first offset amount, from the second management area disposed in the recording area, by using an information recording apparatus, and to quickly determine the second offset amount corresponding to the first offset amount. Then, it is possible to certainly verify the first offset amount set in the above manner, on the basis of the information obtained from the second management area, in the judging process. Alternatively, it is possible to certainly perform recording and reproduction operations with respect to the information recording medium, on the basis of the information obtained from the second management area, on the information recording apparatus or information reproducing apparatus, for example.

(Offset Amount Measuring Apparatus)

The above object of the present invention can be also achieved by an offset amount measuring apparatus for measuring an offset amount, which is a shift amount in a radial direction between radial positions on first and second recording tracks, the radial positions being associated with each other by a pre-format address (e.g. sector number or sector address) given in advance to the first and second recording tracks, in an information recording medium provided with at least: a disc-shaped first recording layer in which the first recording track is formed to record therein record information; and a disc-shaped second recording layer in which the second recording track is formed to record therein the record information in a direction equal to or opposite to that in the first recording track of the first recording layer (i.e. in the parallel manner or opposite manner), the offset amount measuring apparatus provided with: a recording device (i) for recording information for measurement, into the first recording track, by a predetermined section or by a predetermined length, from one measurement reference position which is specified by the pre-format address, and for recording the information for measurement, into the second recording track, by the predetermined section or by the predetermined length, from or toward a measurement correspondence position, which is associated with the one measurement reference position by the pre-format address; a first detecting device for detecting a first border position which is a border of a first recorded area in which the information for measurement is recorded and a first unrecorded area in which the information for measurement is unrecorded in the first recording track, on the basis of a difference in reflectance between the first recorded area and the first unrecorded area, with a central axis of the information recording medium as a reference; a second detecting device for detecting a second border position which is a border of a second recorded area in which the information for measurement is recorded and a second unrecorded area in which the information for measurement is unrecorded in the second recording track, on the basis of a difference in reflectance between the second recorded area and the second unrecorded area, with the central axis as a reference; and a determining device for determining the offset amount, on the basis of the detected first and second border positions.

According to the offset amount measuring apparatus of the present invention, substantially as in the case of the above-mentioned offset amount measuring method of the present invention, even if there arises a shift or offset in accordance with the eccentricity and the deviation described above, it is possible to clear to what extent the shift or offset is, by measuring the offset amount, by using the recording device for measurement, such as a semiconductor laser and an optical pickup, the first detecting device, such as a light detector and an optical pickup, the second detecting device, such as a light detector and an optical pickup, and the determining device, such as a CPU and a controller. Moreover, it is also possible to clear whether or not the countermeasures to the eccentricity and the deviation are required. In addition, it is also possible to clear whether or not the countermeasures are good if some countermeasures are taken, such as the verification of the offset amount which is performed on purpose.

Incidentally, even in the offset amount measuring apparatus of the present invention, it is also possible to adopt the same aspects as those of the offset amount measuring method of the present invention.

The nature, utility, and further features of this invention will be more clearly apparent from the following detailed description with reference to preferred embodiments of the invention when read in conjunction with the accompanying drawings briefly described below.

As explained above, according to the offset amount measuring method of the present invention, it is provided with: the recording process for measurement; the first detecting process; the second detecting process; and the determining process. According to the offset amount measuring apparatus of the present invention, it is provided with: the recording device for measurement; the first detecting device; the second detecting device; and the determining device. Thus, even if there arises a shift or offset in accordance with the eccentricity and the deviation described above, it is possible to clear to what extent the shift or offset is, by measuring the offset amount, and moreover, it is also possible to clear whether or not the countermeasures to the eccentricity and the deviation are required. In addition, it is also possible to clear whether or not the countermeasures are good if some countermeasures are taken, such as the verification of the offset amount which is performed on purpose.

BRIEF DESCRIPTION OF THE DRAWINGS

FIG. 1 are a substantial plan view showing the basic structure of an optical disc having a plurality of recording areas, as being a measurement target, in a first embodiment of an offset amount measuring apparatus and method of the present invention (FIG. 1(a)), and a schematic cross sectional view of the optical disc and a corresponding conceptual diagram showing a recording area structure in the radial direction (FIG. 1(b));

FIG. 9 is a conceptual view under the parallel manner and the opposite manner, showing the data structure of the two-layer type optical disc and the recording area represented by the sector number, in a second embodiment of the offset amount measuring apparatus and method of the present invention;

DETAILED DESCRIPTION OF THE PREFERRED EMBODIMENTS

First Embodiment

Figure 2:
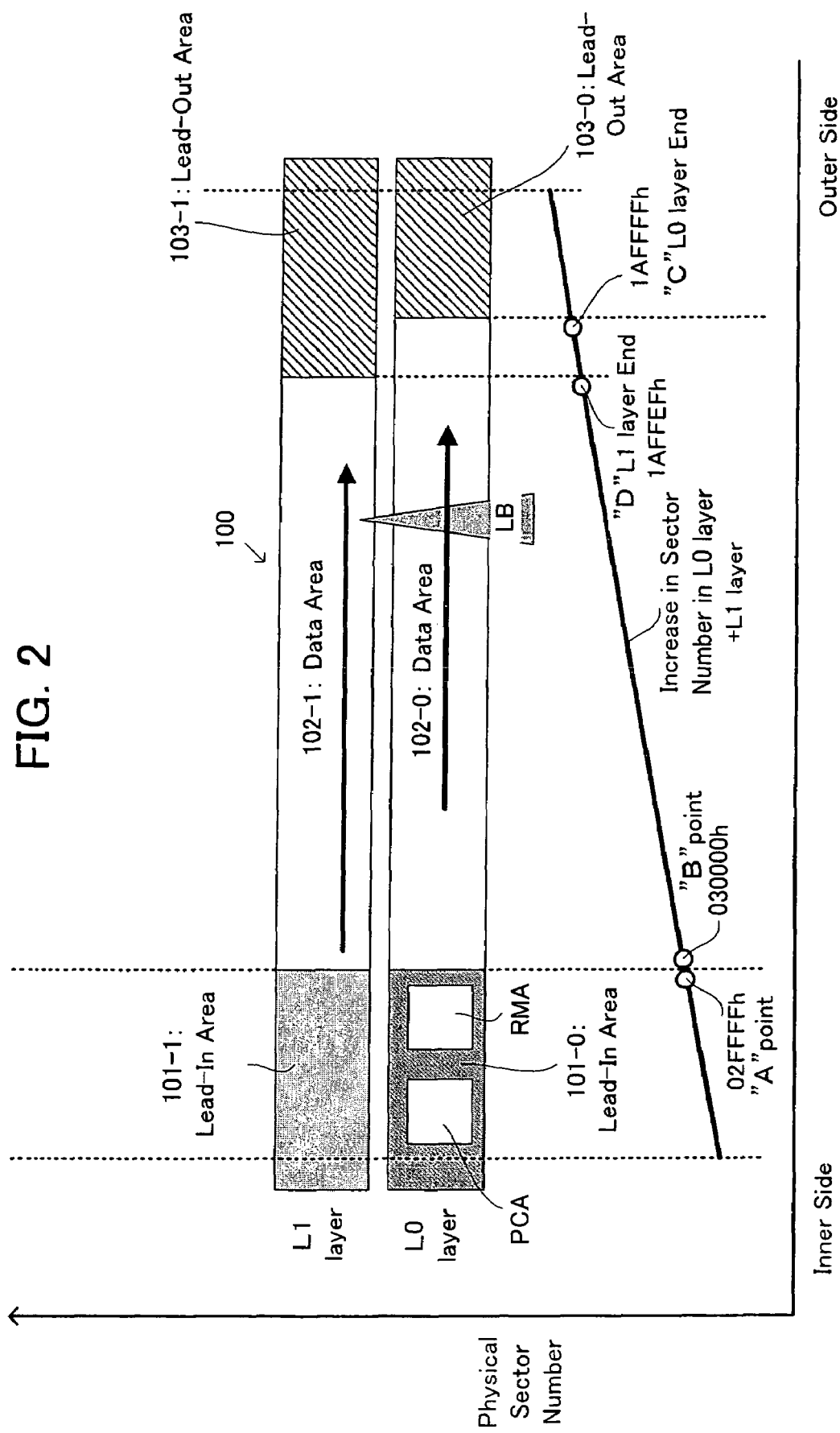
FIG. 2 is a conceptual graph showing the data structure of a two-layer type optical disc, the sector number of a sector which constitutes an ECC block in the recording area of the optical disc, and the recording or reproducing method in a parallel manner of the optical disc, in the first embodiment.

A first embodiment according to the offset amount measuring method and apparatus of the present invention will be explained hereinafter with reference to FIG. 1 to FIG. 8.

At first, with reference to FIG. 1(a) and FIG. 1(b), the basic structure of an optical disc, which is a measurement target in the first embodiment, will be discussed. FIG. 1(a) is a substantial plan view showing the basic structure of an optical disc having a plurality of recording areas, in the first embodiment, and FIG. 1(b) is a schematic cross sectional view of the optical disc and a corresponding conceptual diagram showing a recording area structure in the radial direction. Incidentally, FIG. 1(a) and FIG. 1(b) show a disc in an opposite track manner.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 1 as being the center; a lead-in area 101; a data recording area 102; and a lead-out area 103 or a middle area 104. Then, recording layers or the like are laminated on a transparent substrate 106, for example. In each recording area of the recording layers, a track or tracks 10, such as groove tracks and land tracks, are alternately placed, spirally or concentrically, with the center hole 1 as the center. Moreover, on the track 10, data is divided by a unit of ECC block 11 and recorded. The ECC block 11 is a data management unit by which the recording information can be error-corrected.

Incidentally, the present invention is not particularly limited to the optical disc having the three areas as described above. For example, even if the lead-in area 101 and the lead-out area 103 or the middle area 104 do not exist, a data structure explained below can be constructed. Moreover, as described later, the lead-in area 101 and the lead-out area 103 or the middle area 104 may be further segmentized.

Particularly, the optical disc 100 in the embodiment, as shown in FIG. 1(b), has such a structure that a L0 layer and a L1 layer, which constitute one example of the "first and second recording layers" of the present invention, respectively, descried later, are laminated on the transparent substrate 106. Upon the recording and reproduction of such a two-layer type optical disc 100, the data recording/reproduction in the L0 layer or the L1 layer is performed, depending on which recording layer has the focus position of laser light LB, irradiated from the lower to the upper side in FIG. 1(b). Moreover, the optical disc 100 in the embodiment is not limited to a two-layer, single-sided type, i.e., a dual layer type, but may be a two-layer, double-sided type, i.e. a dual layer, double-sided type. Furthermore, the optical disc 100 in the embodiment is not limited to the optical disc having the two recording layers, as described above, but may be an optical disc of a multilayer type which has three or more layers.

Incidentally, the recording or reproduction procedure of the two-layer type optical disc in the opposite manner and in a parallel manner and the data structure of each layer will be described later.

Figure 3:
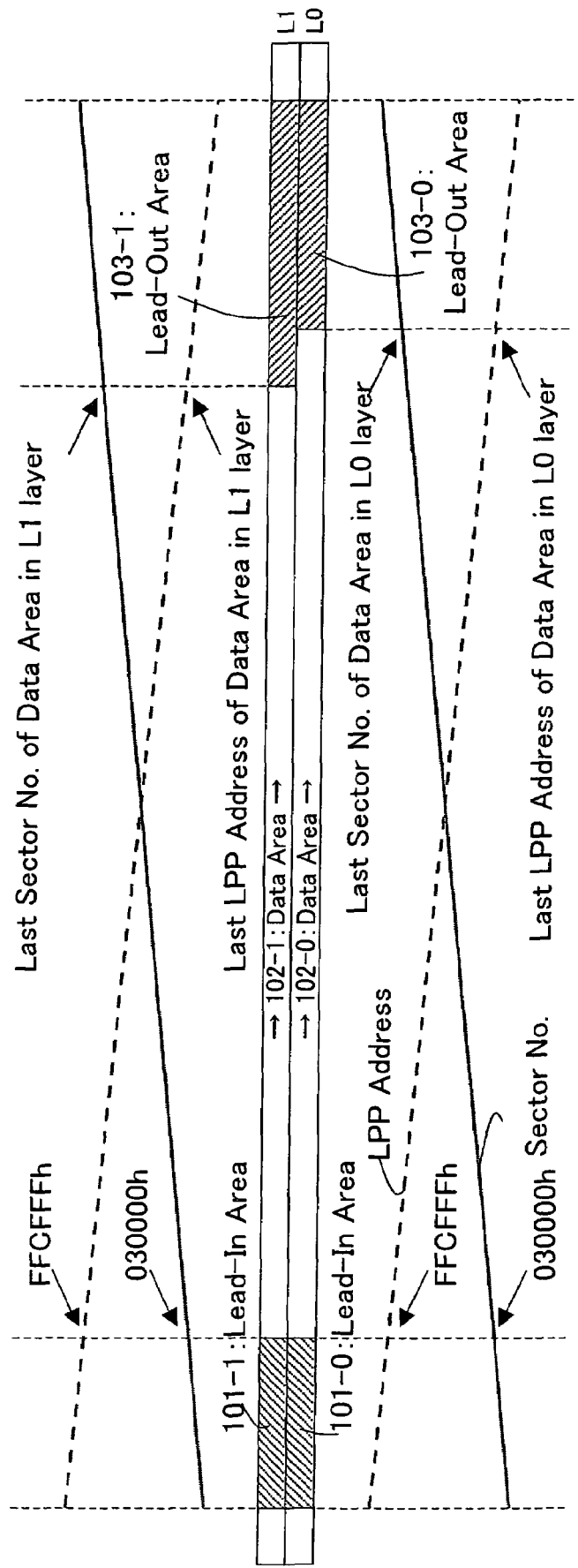
FIG. 3 is a conceptual graph showing the data structure of the two-layer type optical disc, the sector number of the sector which constitutes the ECC block in the recording area of the optical disc, a land pre-pit address, and the recording or reproducing method in the parallel manner of the optical disc, in the first embodiment.

Next, with reference to FIG. 2 and FIG. 3, an explanation will be given to the data structure of the two-layer type optical disc, the physical sector number of a sector which constitutes an ECC block in the recording area of the optical disc, a land pre-pit address in the recording area of the optical disc, and the recording or reproducing method in a parallel manner of the optical disc, in the first embodiment. The physical sector number herein (hereinafter referred to as a "sector number", as occasion demands) is position information which indicates an absolute physical address in the recording area of the optical disc. The land pre-pit address (hereinafter referred to as an "LPP address", as occasion demands) is pre-formatted position information corresponding to the sector number. FIG. 2 is a conceptual graph showing the data structure of the two-layer type optical disc, the sector number of the sector which constitutes an ECC block in the recording area of the optical disc, and the recording or reproducing method in the parallel manner of the optical disc, in the first embodiment. FIG. 3 is a conceptual graph showing the data structure of the two-layer type optical disc, the sector number of the sector which constitutes the ECC block in the recording area of the optical disc, the land pre-pit address, and the recording or reproducing method in the parallel manner of the optical disc, in the first embodiment. Incidentally, the vertical axis in FIG. 2 and FIG. 3 indicates the land pre-pit address in addition to the sector number expressed by hexadecimal notation, and the horizontal axis indicates a relative position in the radial direction of the optical disc.

As shown in FIG. 2, the two-layer type optical disc 100 in the first embodiment is provided with two recording layers formed on a not-illustrated substrate, i.e. the L0 layer and the L1 layer.

Specifically, the L0 layer is provided, from the inner to the outer circumferential side, with: a lead-in area 101-0; a data area 102-0; and a lead-out area 103-0. The lead-in area 101-0 is provided with: a PC (Power Calibration) area PCA for an OPC (Optimum Power Control) Process; and a RM (Recording Management) area RMA which constitutes one example of the "first and second management areas" of the present invention in which recording management information is recorded; or the like.

On the other hand, the L1 layer is provided, from the inner to the outer circumferential side, with: a lead-in area 101-1; a data area 102-1; and a lead-out area 103-1. The lead-in area 101-1 may be also provided with a not-illustrated PCA or the like.

The two-layer type optical disc 100 is constructed in the above manner, so that in the recording or reproduction of the optical disc 100, the laser light LB is irradiated from the side of a not-illustrated substrate, i.e., from the lower to the upper side in FIG. 2, by the not-illustrated optical pickup of an information recording/reproducing apparatus of the present invention described later, and the focal distance thereof or the like is controlled. At the same time, the travel distance and direction in the radial direction of the optical disc 100 are controlled. By this, the data is recorded into each recording layer, or the recorded data is reproduced.

In particular, as the recording or reproduction procedure of the two-layer type optical disc in the first embodiment, the parallel manner may be adopted. In the parallel manner, if the recording or reproduction is ended in the L0 layer, the optical pickup, located on the most outer circumference of the optical disc, needs to be displaced again to the inner circumferential side, when the recording or reproduction is started in the L1 layer. Thus, it takes more time, by that much, to change from the L0 layer to the L1 layer, as compared to the "opposite manner" described later.

Specifically, at first, in the L0 layer, as the optical pickup is displaced in the lead-in area 101-0, the data area 102-0, and the lead-out area 103-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (refer to a C point in FIG. 2), and the optical pickup is displaced to the lead-out area 103-0 which functions as the buffer, by which the recording or reproduction is performed in the L0 layer. On the other hand, in the L1 layer, specifically, as the optical pickup is displaced in the lead-in area 101-1, the data area 102-1, and the lead-out area 103-1, from the inner to the outer circumferential side, the sector number in the recording area of the optical disc 100 increases. More specifically, the optical pickup sequentially accesses the lead-in area 101-1 which functions as the buffer, the start position of the data area 102-1 with a sector number of "030000h" (refer to the B point in FIG. 2), and the end position of the data area 102-1 with a sector number of "1AFFEFh" (refer to a D point in FIG. 2), and the optical pickup is displaced to the lead-out area 103-1, by which the recording or reproduction is performed in the L1 layer.

Thus, content information is recorded or reproduced at the same time that the optical pickup is continuously displaced in the sector numbers of "030000h" to "1AFFFFh" of the data area 102-0 in the L0 layer and in the sector numbers of "030000h" to "1AFFEFh" of the data area 102-1 in the L1 layer, for example.

With respect to the sector number explained above, a Logical Block Address (LBA) is assigned or allocated, one to one. More specifically, for example, in the L0 layer, a "000000" LBA corresponds to the sector number of "030000h", and a "17FFFF" LBA corresponds to the sector number of "1AFFFFh". Moreover, in the L1 layer, a "180000" LBA corresponds to the sector number of "030000h", and a "2FFFEF" LBA corresponds to the sector number of "1AFFEFh".

Next, with reference to FIG. 3, an explanation will be given to a relationship between the sector number in the parallel manner and the LPP address.

As shown in FIG. 3, it is possible to obtain the LPP address in the L0 layer and the L1 layer from the sector number in the L0 layer and the L1 layer. More specifically, a sector number of "0030000h" in the hexadecimal numeral is converted to a binary number of "000000000011000000000000000000", the bits from the fifth to the 28th bit are inverted to "111111111100111111111111", and it is reconverted to the "FFCFFFh" in the hexadecimal numeral, to thereby obtain the LPP address.

Moreover, a recording end position in the data area 102-0 (102-1) can be set in each recording layer.

Figure 4:
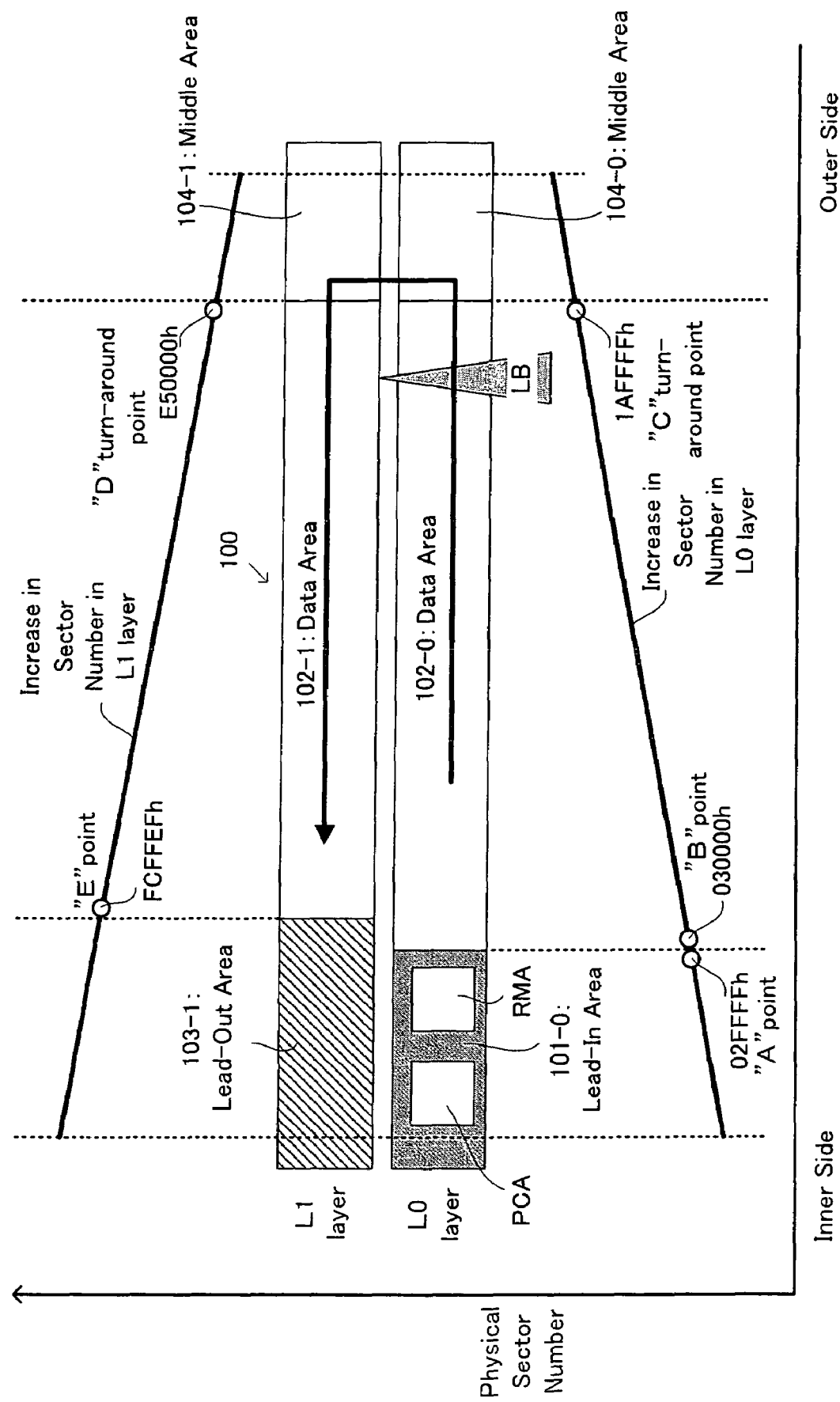
FIG. 4 is a conceptual graph showing the data structure of the two-layer type optical disc, the physical sector number of the sector which constitutes the ECC block in the recording area of the optical disc, and the recording or reproducing method in an opposite manner of the optical disc, in the first embodiment.
Figure 5:
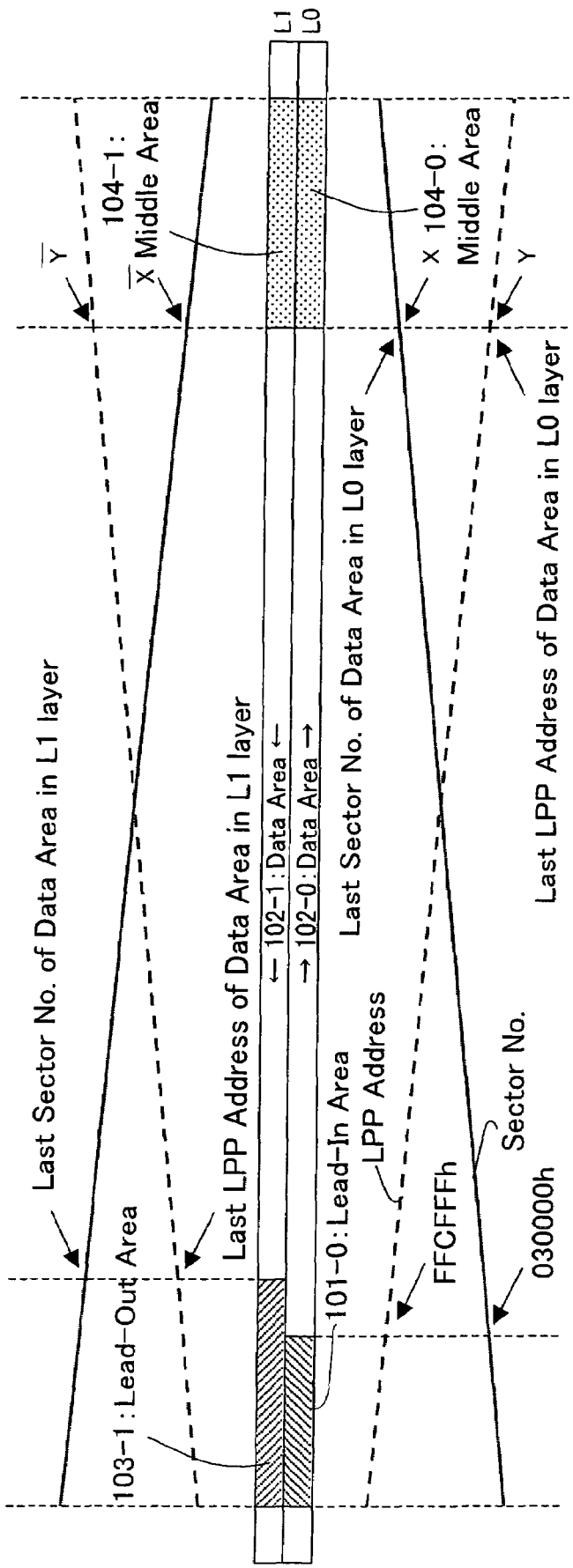
FIG. 5 is a conceptual graph showing the data structure of the two-layer type optical disc, the sector number of the sector which constitutes the ECC block in the recording area of the optical disc, the land pre-pit address, and the recording or reproducing method in the opposite manner of the optical disc, in the first embodiment.

Next, with reference to FIG. 4 and FIG. 5, an explanation will be given to the data structure of the two-layer type optical disc, the physical sector number of a sector which constitutes an ECC block in the recording area of the optical disc, and the recording or reproducing method in an opposite manner of the optical disc, in the first embodiment. FIG. 4 is a conceptual graph showing the data structure of the two-layer type optical disc, the sector number of the sector which constitutes an ECC block in the recording area of the optical disc, and the recording or reproducing method in the opposite manner of the optical disc, in the first embodiment. FIG. 5 is a conceptual graph showing the data structure of the two-layer type optical disc, the sector number of the sector which constitutes the ECC block in the recording area of the optical disc, the land pre-pit address, and the recording or reproducing method in the opposite manner of the optical disc, in the first embodiment. Incidentally, the vertical axis and the horizontal axis in FIG. 4 and FIG. 5 are the same as those in FIG. 2 and FIG. 3 described above.

As shown in FIG. 4, the two-layer type optical disc 100 in the first embodiment of the information recording medium of the present invention is provided with two recording layers laminated on a not-illustrated substrate, i.e. the L0 layer and the L1 layer.

Specifically, the L0 layer is provided, from the inner to the outer circumferential side, with: a lead-in area 101-0; a data area 102-0; and a middle area 104-0. The lead-in area 101-0 is provided with: the above-mentioned PC area PCA; and the above-mentioned RM area RMA; or the like. Moreover, the middle area 104-0 has a basic function to prevent a recording or reproduction position with respect to the L0 layer and the L1 layer from deviating to the outside of the substrate. It also has a function as a so-called" jump buffer area", which is to prevent, in layer-to-layer jump, the recording or production position from deviating to the outside of the substrate.

On the other hand, the L1 layer is provided, from the outer to the inner circumferential side, with: a middle area 104-1; a data area 102-1; and a lead-out area 103-1. The lead-out area 103-1 may be also provided with a not-illustrated PCA or the like.

The two-layer type optical disc 100 is constructed in the above manner, so that in the recording or reproduction of the optical disc 100, the focal distance thereof or the like is controlled in the same manner as in the above-mentioned parallel manner.

In particular, as the recording or reproduction procedure of the two-layer type optical disc in the first embodiment, the opposite manner may be adopted. More specifically, the opposite manner herein is such a manner that the optical pickup of the information recording/reproducing apparatus described later is displaced from the inner to the outer circumferential side, i.e. in a direction of a right-pointing arrow in FIG. 4, in the L0 layer as the recording or reproducing procedure of the two-layer type optical disc, while the optical pickup is displaced from the outer to the inner circumferential side, i.e. in a direction of a left-pointing arrow in FIG. 4, in the L1 layer, to thereby perform the recording or reproduction on the two-layer type optical disc. In the opposite manner, if the recording or reproduction is ended in the L0 layer, the optical pickup, located on the most outer circumference, does not need to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel manner. This is why the opposite manner is adopted in the recording of large volumes of content information.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 4), the start position of the data area 102-0 with a sector number of "030000h" (refer to a B point in FIG. 4), and the end position of the data area 102-0 with a sector number of "1AFFFFh" (hereinafter referred to as a "turn-around point" in the L0 layer, as occasion demands: refer to a C point in FIG. 4), and the optical pickup is displaced to the middle area 104-0 which functions as the buffer, by which the recording or reproduction is performed in the L0 layer. Incidentally, in the embodiment, "h" which is the end of "30000h" or the like indicates that it is expressed by hexadecimal numeral. On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 4), and the end position of the data area 102-1 with a sector number of "FCFFEFh" (refer to an E point in FIG. 4), and the optical pickup is displaced to the lead-out area 103-1, by which the recording or reproduction is performed in the L1 layer.

All the sector numbers in the L0 layer and the L1 layer explained above have a 15's complement number relationship in the hexadecimal numeral. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal numeral to a binary number of "000110101111111111111111", inverting the bits to "111001010000000000000000", and reconverting it to the "E50000h" in the hexadecimal numeral.

Thus, the content information is recorded or reproduced at the same time that the optical pickup is continuously displaced, in the sector numbers of "030000h" to "1AFFFFh" of the data area 102-0 in the L0 layer and in the sector numbers of "E50000h" to "FCFFEFh" of the data area 102-1 in the L1 layer, for example.

With respect to the physical sector number explained above, a Logical Block Address (LBA) is assigned or allocated, one to one. More specifically, for example, a "000000" LBA corresponds to the sector number of "030000h", and a "17FFFF" LBA corresponds to the sector number of "1AFFFFh". Moreover, a "180000" LBA corresponds to the sector number of "E50000h", and a "2FFFEF" LBA corresponds to the sector number of "FCFFEFh". Thus, for example, a host computer can perform the recording and reproduction operations in accordance with the logical block address managed by a file system, for example, without aware of the physical sector number.

Next, with reference to FIG. 5, an explanation will be given to a relationship between the sector number in the opposite manner and the LPP address, in the first embodiment.

As shown in FIG. 5, it is possible to obtain the LPP address in the L0 layer and the L1 layer from the sector number in the L0 layer and the L1 layer, as in the parallel manner. Therefore, all the LPP addresses in the L0 layer and the L1 layer have a 15's complement number relationship, as in the sector number.

Moreover, even in the opposite manner, a recording end position in the data area 102-0 (102-1) can be set in each recording layer, as in the parallel manner.

As discussed with reference to FIG. 1 to FIG. 5, in the optical disc as being the measurement target in the first embodiment, the radial position on the track 10 of the L0 layer and the radial position on the track 10 of the L1 layer are associated with each other, by the sector number which is one example of the "pre-format address" of the present invention. Then, the radial positions associated with each other are overlapped without offset, as viewed from the normal direction of the substrate surface of the optical disc 100 if there is no eccentricity between the L0 layer and the L1 layer and there is no deviation between the pitch of the track 10 of the L0 layer and the pitch of the track 10 of the L1 layer. In other words, identically, the offset amount is zero. In practice, however, the eccentricity and the deviation are caused, to a greater or lesser extent, because there is a pasting error in the L0 layer and the L1 layer and because different stampas and cutting machines are used upon the L0 layer formation and the L1 layer formation, or for similar reasons.

Figure 6:
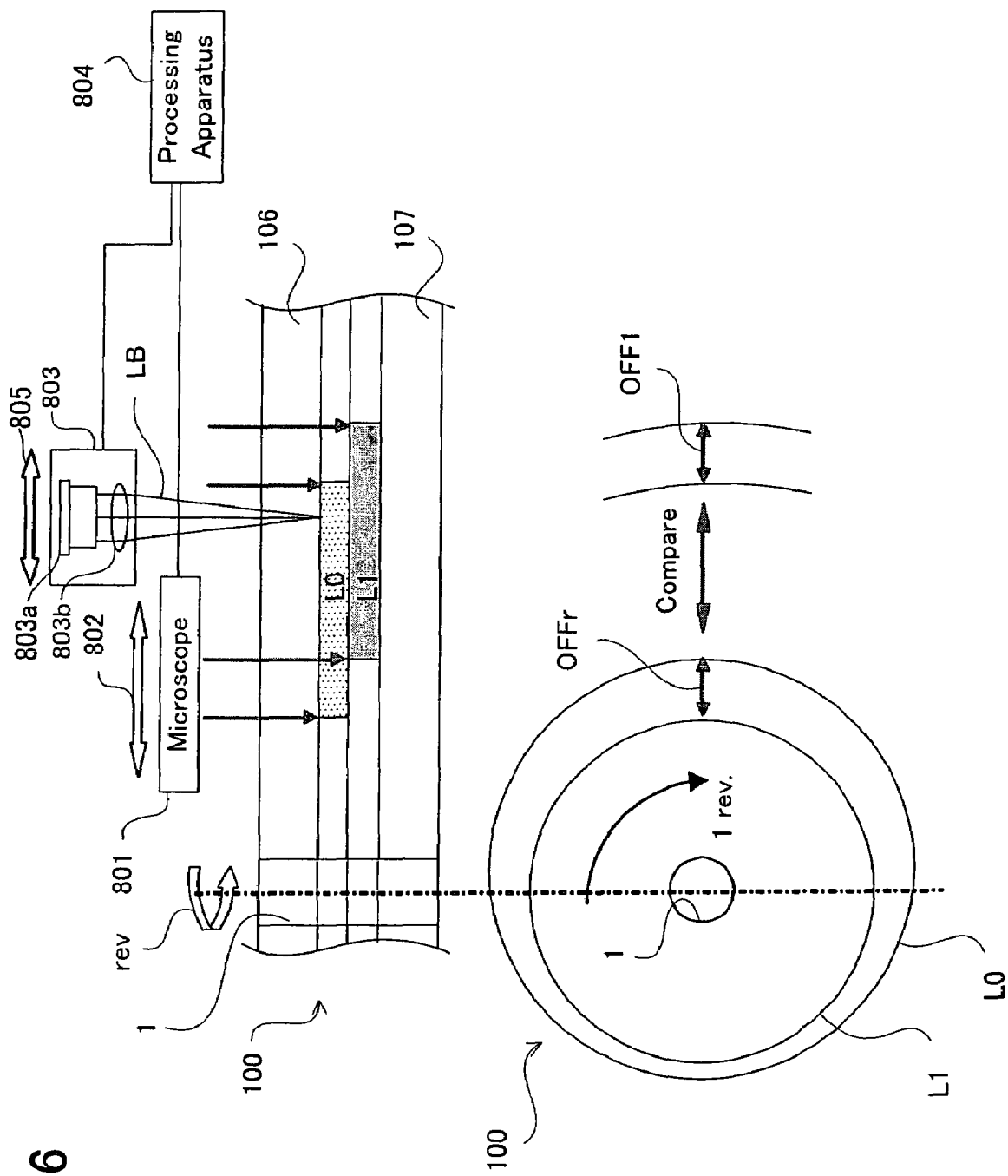
FIG. 6 is a conceptual view schematically showing the offset amount measuring apparatus and method in the first embodiment.
Figure 7:
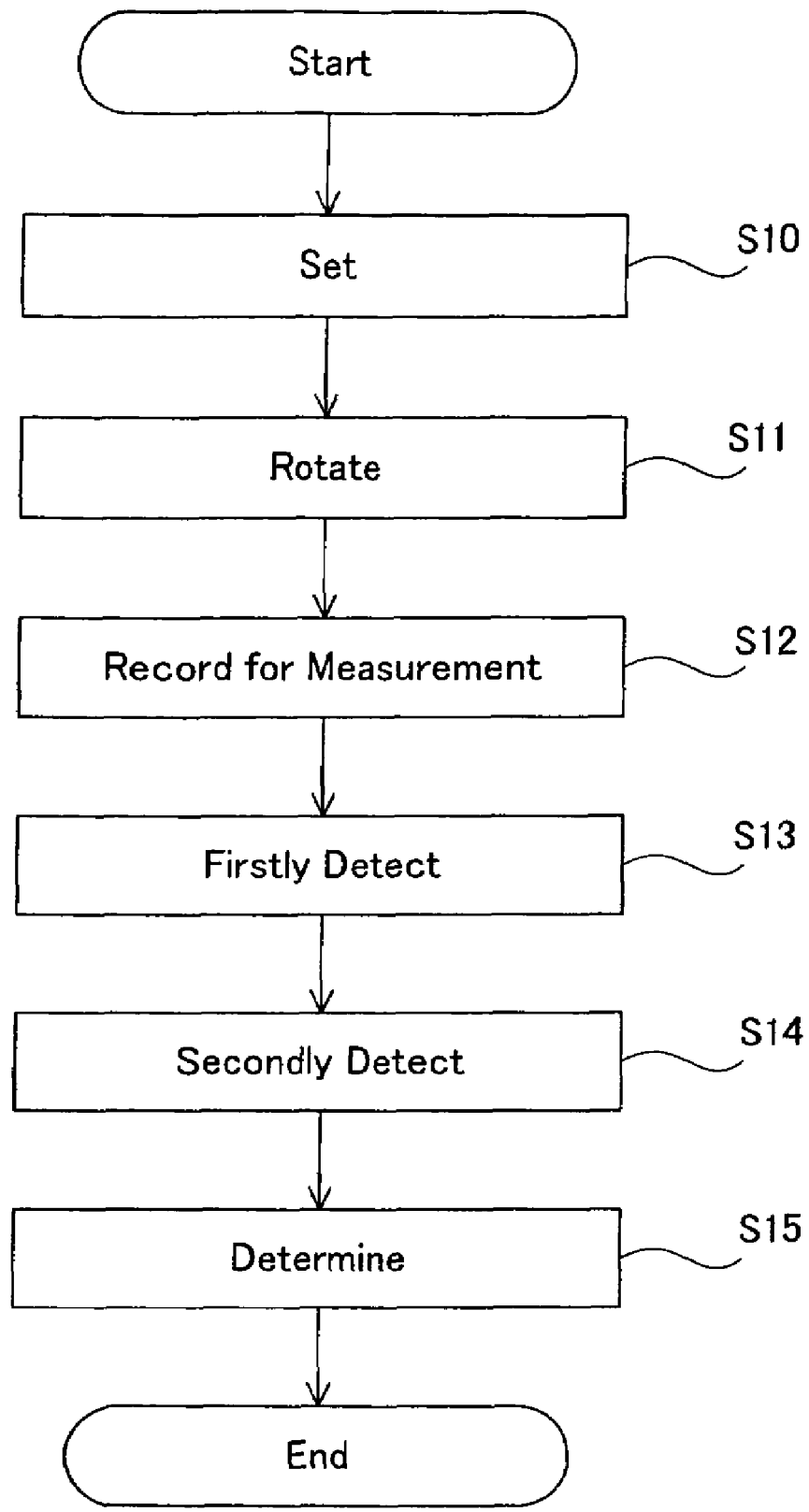
FIG. 7 is a flowchart of the offset amount measuring method in the first embodiment.

Thus, as discussed next with reference to FIG. 6 to FIG. 8, the offset amount measuring apparatus and method in the first embodiment are constructed to measure the offset amount caused as described above. FIG. 6 is a conceptual view schematically showing the offset amount measuring apparatus and method in the first embodiment. FIG. 7 is a flowchart of the offset amount measuring method in the first embodiment. FIG. 8 are conceptual views schematically showing a recording process for measurement, out of the offset amount measuring method.

As shown in the schematic block diagram on the upper side of FIG. 6, the offset amount measuring apparatus in the embodiment is provided with: a microscope 801; a recording apparatus 803 for measurement; and a processing apparatus 804.

The microscope 801 functions as one example of the "first detecting device" and the "second detecting device" of the present invention, and moreover, as one example of the "light microscope". The microscope 801 can be displaced as in an arrow 802 along the recording surface of the optical disc 100, on the basis of the center hole 1 of the optical disc 100. Moreover, the microscope 801 can be selectively focused on the L0 layer or the L1 layer, under the control of the processing apparatus 804.

The recording apparatus 803 for measurement has: a semiconductor laser 803a; and a lens 803b, such as a condenser lens and an eye lens, and can be displaced as in an arrow 805 along the recording surface of the optical disc 100, under the control of the processing apparatus 804. The recording apparatus 803 for measurement is constructed to irradiate a desired radial position in a desired recording layer (i.e. the L0 layer or the L1 layer) with the laser light LB as being a laser for writing. The recording apparatus 803 for measurement functions as one example of the "recording device for measurement" of the present invention.

The processing apparatus 804 has a CPU, or a controller, a memory, or the like. The processing apparatus 804 controls the operation of the microscope 802 and collects the output information, and at the same time, controls the operation of the recording apparatus 803 for measurement. The processing apparatus 804 functions as one example of the "determining device" of the present invention.

As shown in a schematic plan view on the lower side of FIG. 6, the disc 100 has offset OFFr caused by the pasting error or the like, between the L0 layer and L1 layer which are laminated.

Figure 8A:
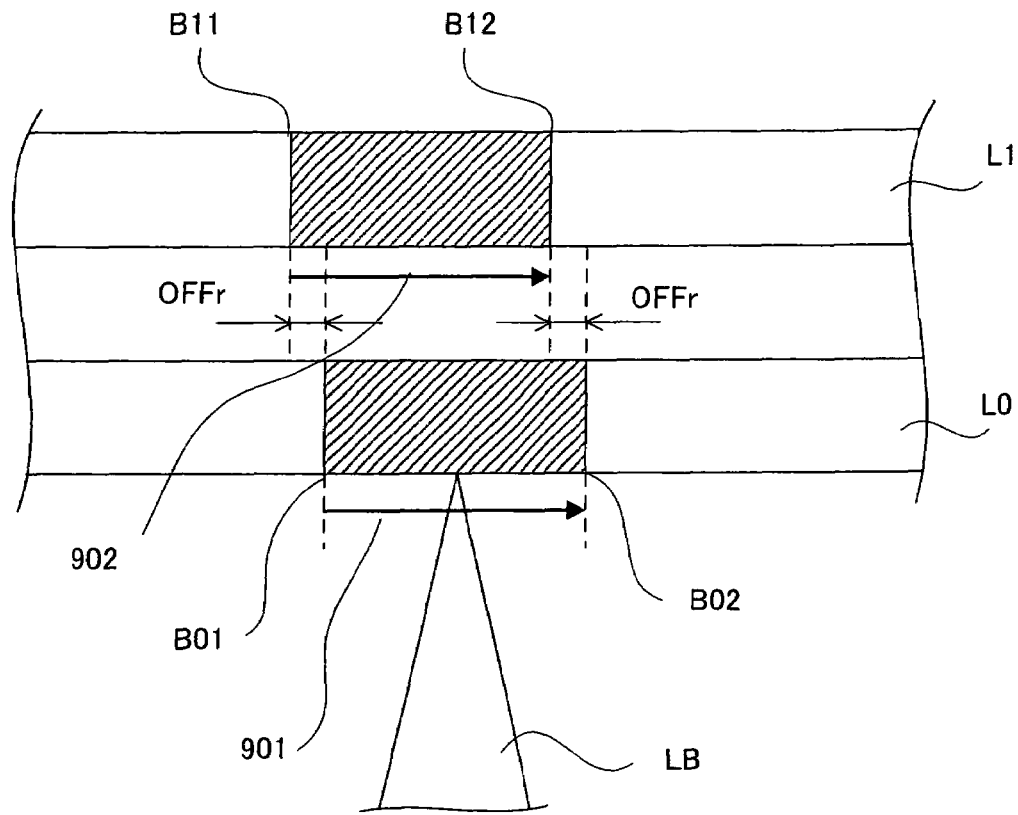
FIG. 8 are conceptual views schematically showing a recording process for measurement, out of the offset amount measuring method in the first embodiment.

As shown in FIG. 7, in the embodiment, at first, the optical disc 100 having the offset OFFr is set on the offset amount measuring apparatus shown in FIG. 6 (step S10). Then, as shown in FIG. 6, the optical disc 100 is rotated, with the center hole 1 as a central axis (step S11). The rotation condition at this time may be the same as that of the normal information recording apparatus, or may be fixed or proper on the offset amount measuring apparatus. For example, the optical disc 100 is rotated by the same motor as a spindle motor owned by an information recording apparatus described later. In this condition, information for measurement is recorded. In other words, the recording process for measurement is performed (step S12). Specifically, as shown in FIG. 8(a), in the case of the "parallel manner", the information for measurement is recorded, with the laser light LB, onto the track 10 in the L0 layer, by a predetermined number of sectors, along an arrow 901 (i.e. from the inner to the outer circumferential side), from a radial position B01 as being one example of the "measurement reference position" of the present invention, which is specified by the sector number. At this time, the laser light LB is focused on the L0 layer from the semiconductor laser 803a owned by the recording apparatus 803 for measurement, under the control of the processing apparatus 804. By this, the information for measurement is recorded into a hatching area in the L0 layer in FIG. 8(a), which is from the radial position B01 to a radial position B02. Before or after this, the information for measurement is recorded, with the laser light LB, by a predetermined number of sectors, along an arrow 902 (i.e. from the inner to the outer circumferential side), from a radial position B11 which is associated with the radial position B01 by the sector number; namely, which has the same sector number, as being one example of the "measurement correspondence position" of the present invention, in the track 10 of the L1 layer. At this time, the laser light LB is focused on the L1 layer through the L0 layer. By this, the information for measurement is recorded into a hatching area in the L1 layer in FIG. 8(a), which is from the radial position B11 to a radial position B12. In this case, there is the above-mentioned offset between the radial position B01, which is also one example of the "first border position" of the present invention, and the radial position B11, which is also one example of the "second border position" of the present invention, by the offset amount OFFr according to the pasting error or the like. In the same manner, there is the above-mentioned offset between the radial position B02, which is also one example of the "first border position" of the present invention, and the radial position B12, which is also one example of the "second border position" of the present invention, by the offset amount OFFr according to the pasting error or the like. If the size of the information for measurement is not large, the offset situated nearer the disc outer circumference is substantially equal to the offset situated nearer the disc inner circumference. Thus, there is little difference in selecting both (i) the offset amount OFFr measured based on the radial positions B01 and B11 and (ii) the offset amount OFFr measured based on the radial positions B02 and B12, as the measurement target. The size of the information for measurement is preferably smaller as long as a difference in reflectance between the recorded are where the information for measurement is recorded and unrecorded area, can be detected by first and second detecting processes, discussed next, respectively.

Figure 8B:
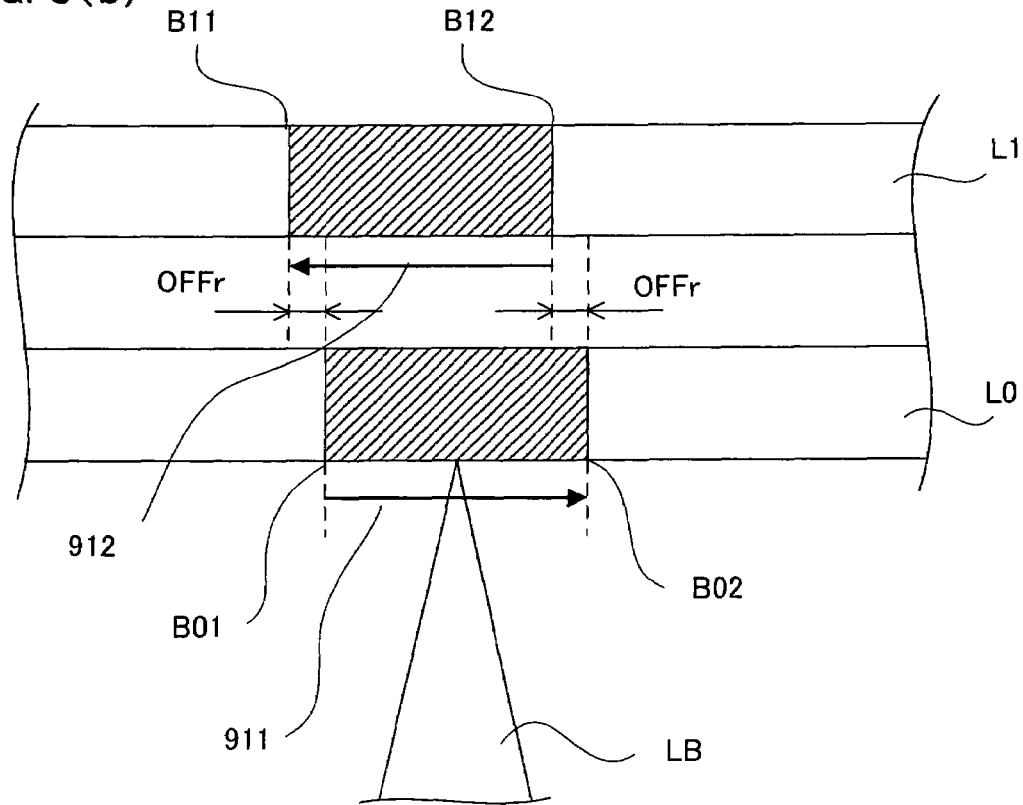

On the other hand, as shown in FIG. 8(b), in the case of the "opposite manner", the information for measurement is recorded, with the laser light LB, onto the track 10 in the L0 layer, by a predetermined number of sectors, along an arrow 911 (i.e. from the inner to the outer circumferential side), from a radial position B01 as being one example of the "measurement reference position" of the present invention, which is specified by the sector number. By this, the information for measurement is recorded into a hatching area in the L0 layer in FIG. 8(b), which is from the radial position B01 to a radial position B02. Before or after this, the information for measurement is recorded, with the laser light LB, by a predetermined number of sectors, along an arrow 912 (i.e. from the outer to the inner circumferential side), toward a radial position B11 which is associated with the radial position B01 by the sector number; namely, which has a complement number relationship with the radial position B01, as being one example of the "measurement correspondence position" of the present invention, in the track 10 of the L1 layer. By this, the information for measurement is recorded into a hatching area in the L1 layer in FIG. 8(b), which is from the radial position B12 toward (or to) the radial position B11. In the case of the "opposite manner", as in the case of the "parallel manner" (refer to FIG. 8(a)), there is the above-mentioned offset between the radial position B01 and the radial position B11, by the offset amount OFFr, and there is also the above-mentioned offset between the radial position B02 and the radial position B12, by the offset amount OFFr.

In FIG. 7 again, after that, the first detecting process is performed to the optical disc 100 after the information for measurement is recorded in the above manner (step S13).

Specifically, an image is taken by the microscope 801 shown in FIG. 6, to thereby cause the processing apparatus 804 to automatically detect the radial position B01 or B02, which is one example of the "first border position" shown in FIG. 8. Such detection, however, may be performed artificially. The detection at this time is performed on the basis of a difference in reflectance between a first recorded area in which the information for measurement is already recorded and a first unrecorded area in which the information for measurement is unrecorded, in the L0 layer. In other words, the reflectance decreases in the first recorded area in which the information for measurement is already recorded, so that it is possible to measure the radial position B01 or B02, which is one example of the "first border position", relatively easily and accurately. At this time, it is possible to detect the radial position B01 or B02, highly accurately, by using the high powered (or high magnification) microscope 801 because it can be displaced in the radial direction of the optical disc 100 as in the arrow 802 on the basis of the center hole 1. The information which indicates the radial position B01 or B02, detected by the microscope 801, is inputted to the processing apparatus 804. Incidentally, as shown in the schematic cross sectional view on the upper side of FIG. 6, the microscope 801 directly measures the reflectance, on a film 107 including a reflective film, an opaque film, or the like, through the transparent substrate 106 of the optical disc 100.

In the embodiment, the radial position B01 or B02, detected in the above manner, is stored into a memory built in the processing apparatus 804. The radial position B01 or B02 may be stored into a memory externally connected to the processing apparatus 804 or a memory built in the microscope.

In FIG. 7 again, after that, the second detecting process is performed to the optical disc 100 after the information for measurement is recorded in the above manner (step S14). By this, as in the case of the first detecting process, the detection in the L1 layer allows the radial position B11 or B12, which is one example of the "second border position", to be detected.

In the embodiment, the radial position B11 or B12, detected in the above manner, is stored into a memory built in the processing apparatus 804, or the like, as in the case of the above-mentioned radial position B01 or B02.

After that, the offset amount is determined by the processing apparatus 804, on the basis of the radial position B01 or B02 as being one example of the "first border position" and the radial position B11 or B12 as being one example of the "second border position", which are detected in the above manner, as one example of the "determining process" of the present invention (step S15). More specifically, the offset amount OFFr is determined by operating or calculating a difference between the radial position B01 in the L0 layer and the radial position B11 in the L1 layer (i.e. a distance between the border positions) which are associated with each other by the sector number over L0 layer and L1 layer. Alternatively, in place of or in addition to this, the offset amount OFFr is determined by operating or calculating a difference between the radial position B02 in the L0 layer and the radial position B12 in the L1 layer which are associated with each other by the sector number. Incidentally, each of the values of the radial position B01, B02, B11, and B12 may be used for the above operation or calculation by reading it from the memory built in the processing apparatus 804 or the like, which has been already stored and held therein the value in the step S13 and the step S14.

According to this embodiment, as discussed above in detail, it is possible to measure the offset amount OFFr, efficiently and highly accurately. Thus, it is possible to clear to what extent the offset amount is, such as whether or not the offset amount is within the standard. For example, if the optical disc 100 is of the type that the recording and reproduction are performed at a constant linear velocity, the offset amount OFFr is larger on the inner circumferential side and smaller on the outer circumferential side. Along with this, the tolerance of the offset amount OFFr at each radial position (in other words, at each address) is set in advance by the standard or the like, so that it is possible to verify whether or not the offset amount OFFr is within the tolerance, in the embodiment. Alternatively, it is also possible to clear whether or not the countermeasures to the eccentricity and the deviation are required, by knowing the offset amount. Therefore, before a user uses the information recording medium (e.g. the optical disc 100), it is also possible to record the information which indicates the offset amount OFFr, onto the optical disc 100, for example by an information recording apparatus described later.

Second Embodiment

A second embodiment according to the offset amount measuring method and apparatus of the present invention will be explained hereinafter with reference to FIG. 9 to FIG. 13. Incidentally, the same constitutional elements and the same processes as those in the first embodiment, explained with reference to FIG. 1 to FIG. 8, carry the same reference numerals, and the explanation thereof are omitted, as occasion demands.

Figure 10:
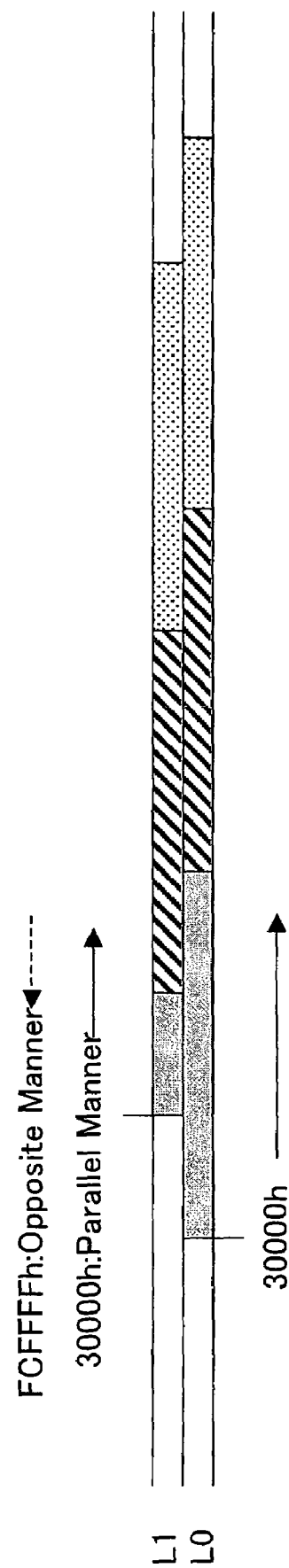
FIG. 10 is a conceptual view showing the recording area represented by the sector number of the two-layer type optical disc and the recording procedure of the optical disc in the parallel manner and the opposite manner, in the second embodiment.

At first, with reference to FIG. 9 and FIG. 10, a more detailed explanation will be given to the data structure of the two-layer type optical disc, which is a measurement target or subject in the second embodiment, and the recording area represented by the sector number, and the recording procedure of the optical disc in the parallel manner and the opposite manner. FIG. 9 is a conceptual view under the parallel manner and the opposite manner, showing the data structure of the two-layer type optical disc and the recording area represented by the sector number, in the second embodiment. FIG. 10 is a conceptual view showing the recording area represented by the sector number of the two-layer type optical disc and the recording procedure of the optical disc in the parallel manner and the opposite manner, in the second embodiment.

In the optical disc 100 in the second embodiment, in the case of the parallel manner, the inner end of the data area in the L1 layer, as being one example of the "second place" of the present invention, which is the reference of the sector number for indicating the start position of the data area on the track 10 in the L1 layer, is located on the outer circumferential side by the first offset amount set in advance, from the inner end of the data area in the L0 layer, as being one example of the "first place" of the present invention, which is the reference of the sector number for indicating the start position of the data area on the track 10 in the L0 layer. Alternatively, in the case of the opposite manner, the inner end of the data area in the L1 layer, as being one example of the "second place" of the present invention, which is the reference of the sector number for indicating the end position of the data area on the track 10 in the L1 layer, is located on the inner circumferential side by the first offset amount set in advance, from the inner end of the data area in the L0 layer, as being one example of the "first place" of the present invention, which is the reference of the sector number for indicating the start position of the data area on the track 10 in the L0 layer.

As shown in FIG. 9, the optical disc is designed such that the most inner circumferential position of the data area 102-1 with a sector number in the L1 layer of "30000h" (in the parallel manner) or "FCFFFFh" (in the opposite manner) is located on the outer circumferential side by the first offset amount, from the start position of the data area 102-1 with a sector number in the L0 layer of "30000h". The "first offset amount" herein is a reference value determined to locate the most inner circumferential position of the data area 102-1 in the L1 layer, on the outer circumferential side from the most inner circumferential position of the data area 102-0 in the L0 layer. Specifically, it is the maximum value of the eccentricity caused by the pasting error in the L0 layer and the L1 layer. More specifically, if the maximum value of the eccentricity in the L0 layer is 40 µm and the maximum value of the eccentricity in the L1 layer is 70 µm, the first offset amount is the sum of the eccentricity in the L0 layer and in the L1 layer, i.e., 110 µm (=40+70). Moreover, by setting the upper limit value of the first offset amount to 200 µm, it is possible to comply with the standard of a two-layer DVD-ROM in the parallel manner. Incidentally, the first offset amount may be indicated as the length (µm) in the radial direction of the optical disc. It may be convertible to the number of sectors or the number of ECC blocks, or may be directly indicated by the number of sectors or the number of ECC blocks which is the predetermined unit of the address.

In order to comply with the standard of the DVD-ROM in the parallel manner, it is necessary to set the start position of the data area 102 (a position with a sector number of "30000h") in a range of 47.6 mm to 48.0 mm in diameter. Therefore, the upper limit value of the first offset amount is 200 µm in radius ((48.0−47.6)÷2=0.2 mm). Thus, the start position of the data area 102-0 in the L0 layer (a position with a sector number of "30000h") may be set in a range of 47.82 mm to 48.0 mm, in the diameter of the optical disc.

As described above, it is better to make a difference in radius between the start positions (positions with a sector number of "30000h") in the L0 layer and the L1 layer, i.e., the first offset amount, larger than the value based on the eccentricity of 110 µm (0.11 mm), and, in the case of the parallel manner, smaller than the value based on the DVD-ROM standard of 200 µm (0.20 mm).

As shown in FIG. 10, if the record data is recorded alternately into the L0 layer and the L1 layer, for example, the record data which is the first content data is firstly recorded into the L0 layer, and secondly recorded into the L1 layer, continuously (refer to a gray area in FIG. 10). In the same manner, the record data which is the second content data is firstly recorded into the L0 layer, and secondly recorded into the L1 layer (refer to a shaded area with right diagonal lines in FIG. 10). Moreover, in the same manner, the record data which is the third content data is firstly recorded into the L0 layer, and secondly recorded into the L1 layer (refer to a dotted area in FIG. 10).

In the parallel manner, every time the record data which is the content data is recorded, the recording operation for the optical disc is performed, in the L1 layer, in the same direction as in the L0 layer, i.e., from the inner to the outer circumferential side. More specifically, the record data which is the first content data is firstly recorded into the L0 layer from the recording start position of the data area 102-0 (with a sector number of "30000h"), and secondly recorded into the L1 layer from the recording start position of the data area 102-1 (with a sector number of "30000h") (refer to the gray area and a solid line arrow in FIG. 10). On the other hand, in the opposite manner, every time the record data which is the content data is recorded, the recording operation for the optical disc is performed, in the L1 layer, in the opposite direction to the case of the L0 layer, i.e., from the outer to the inner circumferential side. More specifically, the record data which is the first content data is firstly recorded into the L0 layer from the recording start position of the data area 102-0 (with a sector number of "30000h"), and secondly recorded into the L1 layer toward (or to) the recording end position of the data area 102-1 (with a sector number of "FCFFFFh") (refer to the gray area and a dashed line arrow in FIG. 10).

In particular, with respect to the two-layer type optical disc according to the second embodiment of the information recording medium of the present invention, the recording operation for the optical disc is performed such that the most outer circumferential position of the data area 102-1 into which the record data is recorded in the L1 layer is located on the inner circumferential side by a second offset amount, from the most outer circumferential position of the data area 102-0 in which the record data has been recorded in the L0 layer. The "second offset amount" herein is a reference value which corresponds to the length in the radial direction and which is determined to locate the most outer circumferential position of the data area 102-1 in the L1 layer, on the inner circumferential side from the most outer circumferential position of the data area 102-0 in the L0 layer. Specifically, it is the maximum value of the eccentricity caused by the pasting error in the L0 layer and the L1 layer. As in the above-mentioned first offset amount, it is better to make the second offset amount larger than the value based on the eccentricity of 110 μm (0.11 mm). In addition, in the case of the parallel manner, it is better to make it smaller than the value based on the DVD-ROM standard of 200 μm (0.20 mm). Incidentally, as in the first offset amount, the second offset amount may be indicated as the length (μm) in the radial direction of the optical disc. It may be convertible to the number of sectors or the number of ECC blocks, or may be directly indicated by the number of sectors or the number of ECC blocks which is the predetermined unit of the address. Moreover, in order to locate the most outer circumferential position of the recording area in the L1 layer, on the inner circumferential side by the second offset amount, from the most outer circumferential position of the recording area in the L0 layer, the record data amount of the L1 layer may be always made smaller than that of the L0 layer, in recording the record data alternately into the L0 layer and the L1 layer. Alternatively, only the record data of the most inner circumference of the L1 layer may be made smaller than that of the L0 layer, and the record data amount other than the most inner circumference of the L1 layer may be made equal to that of the L0 layer.

Therefore, in the case of the parallel manner, the recording operation for the optical disc is performed such that the recording end position of the record data in the L1 layer is located on the inner circumferential side by the second offset amount, from the recording end position of the record data in the L0 layer. On the other hand, in the case of the opposite manner, the recording operation for the optical disc is performed such that the recording start position of the record data in the L1 layer is located on the inner circumferential side by the second offset amount, from the recording end position of the record data in the L0 layer.

As described above, according to the optical disc in the second embodiment of the information recording medium of the present invention, the optical disc is designed such that the most inner circumferential position of the data area 102-1 with a sector number in the L1 layer of "30000h" (in the parallel manner) or "FCFFFFh" (in the opposite manner) is located on the outer circumferential side by the first offset amount, from the start position of the data area 102-1 with a sector number in the L0 layer of "30000h". In addition, with respect to the optical disc according to the second embodiment, the recording operation for the optical disc is performed such that the most outer circumferential position of the data area 102-1 into which the record data is recorded in the L1 layer is located on the inner circumferential side by a second offset amount, from the most outer circumferential position of the data area 102-0 in which the record data has been recorded in the L0 layer. Therefore, if the record data is recorded alternately into the L0 layer and the L1 layer, when the record data is recorded from the start position of the data area 102-1 in the L1 layer after the record data is recorded into the L0 layer, the laser light LB for recording penetrates the L0 layer in the recorded state, regardless of the eccentricity in the L0 layer and the L1 layer. In other words, in the recording in the L1 layer, the laser light LB hardly penetrates or does not penetrate at all the L0 layer in the unrecorded state. Thus, it is possible to stabilize the reproduction features of the record data which is recorded at the start position of the data area 102-1 in the L1 layer.

Generally in the two-layer type optical disc, it is known that the quality of the record data recorded in the L1 layer differs between the case where the data is recorded into the L1 layer by the laser light irradiated through the L0 layer in the state that the record data is already recorded and the case where the data is recorded into the L1 layer by the laser light irradiated through the L0 layer in the state that the record data is unrecorded. In other words, in the case where the record data is recorded by the laser light irradiated in the same condition in the two cases, even if good recording features can be obtained in either one of the cases, the good recording features are not necessarily obtained in the other case, which is a technical problem.

As opposed to this, according to the optical disc in the second embodiment, it is possible to record the record data into the L1 layer by the laser light LB irradiated through the L0 layer in the state that the record data is already recorded. Thus, the above-mentioned technical problem can be solved. As a result, it is possible to perform the proper recording even into any recording area in the L1 layer, with an optimum recording laser power in the case where the record data is recorded into the L1 layer through the L0 layer in the state that the record data is already recorded. In particular, the recording laser power does not need to be changed, and it is only necessary to record the record data in accordance with the pre-format address, such as the sector number. Thus, there is also such an advantage that the recording procedure itself is simplified. In addition, even if the recorded data is reproduced, it is possible to obtain good reproduction features (e.g. an asymmetry value, a jitter value, degree of modulation, a reproduction error rate, etc.).

Incidentally, the optical disc in the second embodiment has the same structure as that of the above-mentioned optical disc 100 in the first embodiment, except the setting of the first and second offset amounts, as described above.

Figure 11:
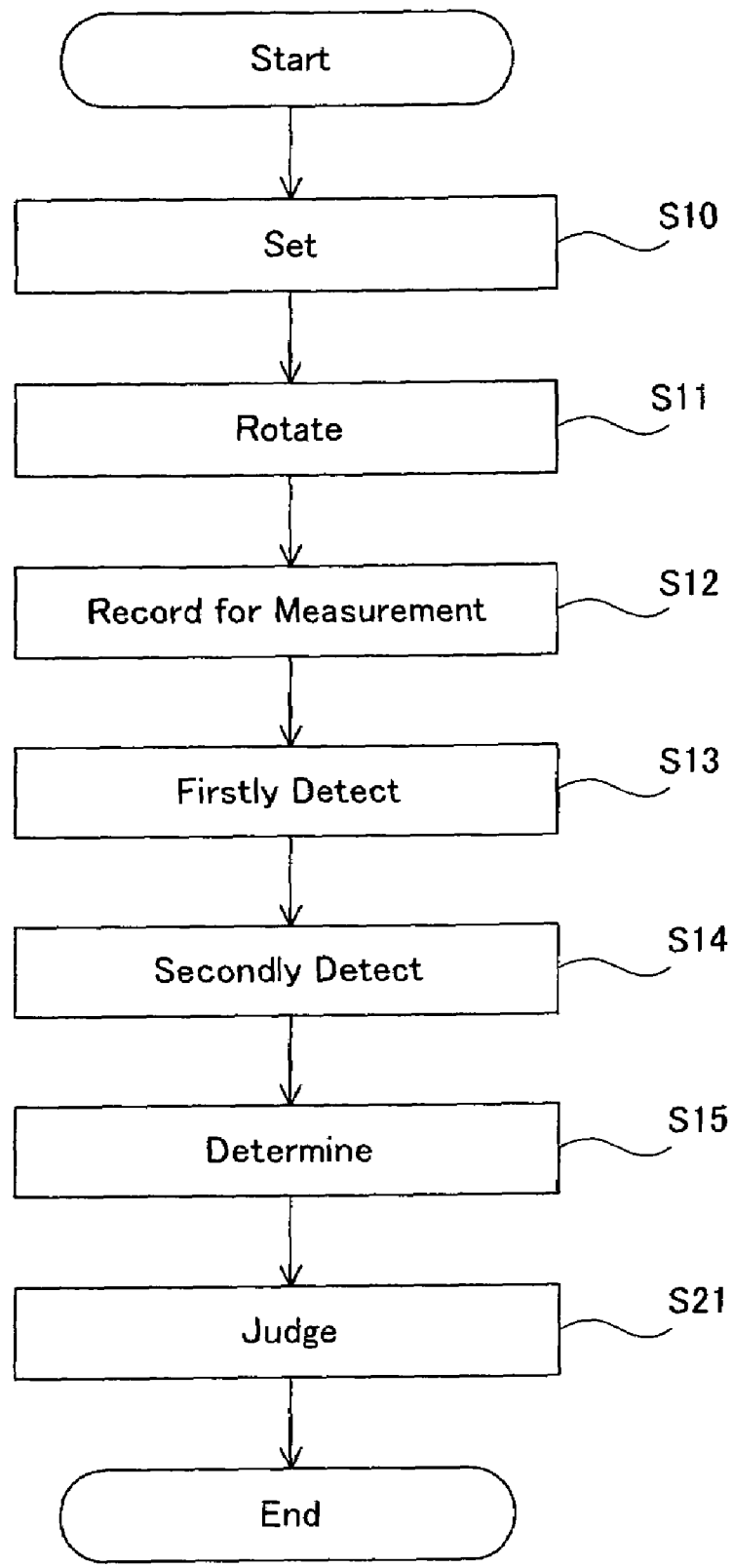
FIG. 11 is a flowchart of the offset amount measuring method in the second embodiment.
Figure 12:
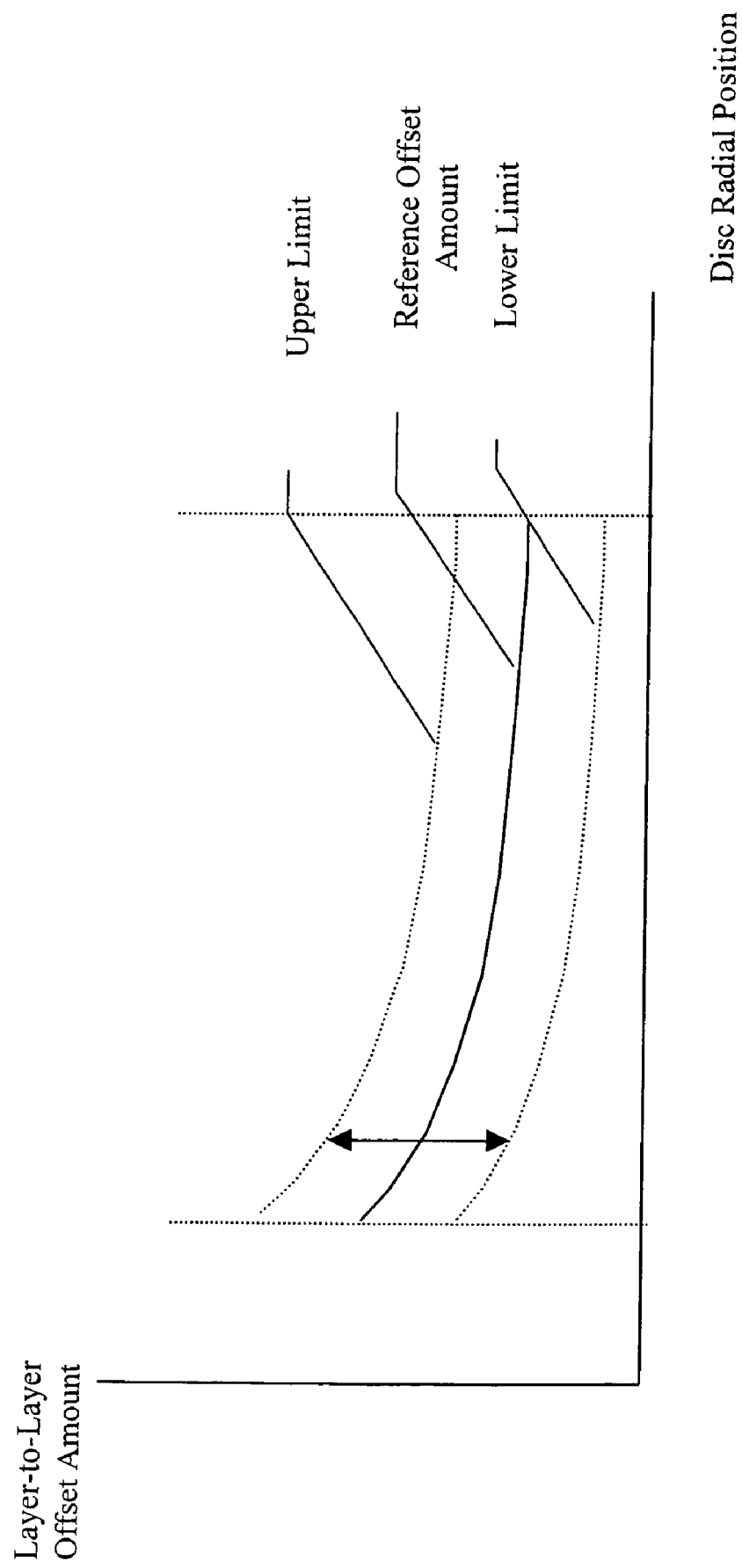
FIG. 12 is a characteristic curve showing a reference offset amount and allowable upper and lower limits with respect to each disc radial position in the second embodiment.

Next, as discussed with reference to FIG. 11 and FIG. 12, the offset amount measuring apparatus and method in the second embodiment are constructed to judge whether or not the first and second offset amounts positively set in advance are within the tolerance thereof, namely, whether or not the first and second offset amounts are properly given as the offset countermeasure. FIG. 11 is a flowchart of the offset amount measuring method in the second embodiment. FIG. 12 is a characteristic curve showing a reference offset amount and allowable upper and lower limits (i.e. tolerance) with respect to each disc radial position.

Incidentally, the hardware structure of the offset amount measuring apparatus in the second embodiment is the same as in the first embodiment shown in FIG. 6. However, as a difference from the first embodiment in the software structure, the second embodiment is constructed such that the processing apparatus 804 (refer to FIG. 6) performs the "judging process" of the present invention.

As shown in FIG. 11, the step S10 to the step S15 are performed, as shown in FIG. 6 to FIG. 8 in the first embodiment, with respect to the optical disc in which the first and second offset amounts are set for the offset countermeasure (the step S10 to the step S15).

After the step S15, it is judged by the judging process whether or not the offset amount OFFr determined until the step S15 (i.e. an experimental value) is within the tolerance set in advance for a first offset amount OFF1. Alternatively, it is judged whether or not the offset amount OFFr determined until the step S15 (i.e. an experimental value) is within the tolerance set in advance for a second offset amount OFF2 (step S21).

As shown in FIG. 12, the judgment is performed by performing comparison of whether the determined offset amount OFFr is smaller, at each disc radial position, than a curve which indicates the upper limit based on a curve which indicates the reference offset amount which is a reference of the first offset amount OFF1 or the second offset amount OFF 2, and whether the determined offset amount OFFr is larger, at each disc radial position, than a curve which indicates the lower limit based on the curve which indicates the reference offset amount. More specifically, in plotting the determined offset amount OFFr at each radial position on the characteristic curve in FIG. 12, it is judged whether or not the plots are between the curve which indicates the upper limit and the curve which indicates the lower limit.

Showing this situation on FIG. 6 in the first embodiment, as on the lower side of FIG. 6, the determined offset amount OFFr (experimental value) is compared with the first offset amount OFF1 set in advance. Then, if the offset amount OFFr determined in the step S15 is not within the tolerance which is between the upper limit and the lower limit (the step S21), it is considered that the first offset amount or the second offset amount is not properly given as the offset countermeasure. On the contrary, if the offset amount OFFr determined in the step S15 is within the tolerance which is between the upper limit and the lower limit (the step S21), it is considered that the first offset amount or the second offset amount is properly given as the offset countermeasure.

Incidentally, in the second embodiment, if the countermeasure to set the first or second offset amount is taken, not only the maximum value of the eccentricity between the L0 layer and the L1 layer, caused by the pasting error, may be considered, but also the maximum value of the deviation between the pitch of the track 10 in the L0 layer and the pitch of the track 10 in the L1 layer may be considered, to thereby set the first or second offset amount. In other words, the first offset amount and the second offset amount may be set on the premise that eccentricity clearance is provided. Moreover, the first offset amount and the second offset amount may be set in view of a predetermined radius of the vicinity of the edge of the beam on the L0 layer, in the case where the L1 layer is irradiated with the focused laser light LB through the L0 layer. In other words, the first offset amount and the second offset amount may be set on the premise that irradiation range clearance is provided.

Incidentally, in the second embodiment, the optical disc 100 may be constructed such that a ratio of the track pitch of the track 10 of the L1 layer to the track pitch of the track 10 of the L1 layer may have a predetermined value less than 1. Alternatively, the optical disc 100 may be constructed such that a difference of the track pitch of the track 10 of the L1 layer to the track pitch of the track 10 of the L1 layer may have a predetermined negative value. In addition, the ratio or difference may be set such that the outer circumferential end portion of the data area in the track 10 of the L1 layer is located on the inner circumferential side, at least by the first offset amount, from the outer circumferential end portion of the data area in the track 10 of the L0 layer. In any cases, it is possible to certainly verify the first or second offset amount set in the above manner, by the judging process on the processing apparatus 804.

Figure 13:
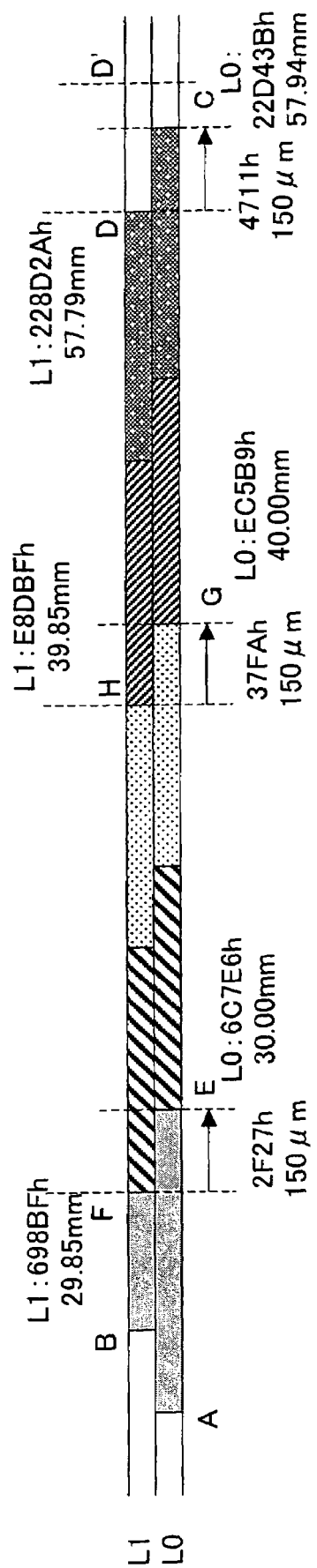
FIG. 13 is a conceptual view showing one specific example of the recording area after the recording operation for the optical disc in the parallel or opposite manner, in the two-layer type optical disc, in the second embodiment.

Next, with reference to FIG. 13, an explanation will be given to one specific example of the recording area after the recording operation for the optical disc in the parallel or opposite manner, in the two-layer type optical disc, in the second embodiment. FIG. 13 is a conceptual view showing one specific example of the recording area after the recording operation for the optical disc in the parallel or opposite manner, in the two-layer type optical disc, in the second embodiment. Incidentally, the address in the L1 layer indicates the sector number in the parallel manner.

As shown in FIG. 13, according to the two-layer type optical disc in the second embodiment, a recording start position B (sector number: "30000h", radius: 24.00 mm) of the data area 102-1 in the L1 layer is located on the outer circumferential side, by the first offset amount (width in the radial direction of 150 μm), from a recording start position A (sector number: "30000h", radius: 23.85 mm) of the data area 102-0 in the L0 layer. Moreover, after the completion of a series of the recording operation for the optical disc in which the record data is recorded alternately into the L0 layer and the L1 layer, it is constructed to locate a most outer circumferential position D (sector number: "228D2Ah", radius: 57.79 mm) of the data area 102-1 in the L1 layer, on the inner circumferential side, by the second offset amount (width in the radial direction of 150 μm), from a most outer circumferential position C (sector number: "22D43Bh", radius: 57.94 mm) of the data area 102-0 in the L0 layer.

In particular, according to one specific example of the two-layer type optical disc in the second embodiment, it is constructed to always locate the recording end position of the data area 102-1 in the L1 layer, on the inner circumferential side, by the second offset amount (width in the radial direction of 150 μm), from the recording end position of the data area 102-0 in the L0 layer, in the recording operation for the optical disc in which the record data is recorded alternately into the L0 layer and the L1 layer. In order to do so, the actual recording end position of the data area 102-1 in the L1 layer is determined, including an influence by the first offset amount, in addition to the second offset amount. Incidentally, the method of determining the recording end position can be obtained experimentally, experientially, identically, or by simulation, or the like.

Specifically, as described above, the above-mentioned recording start position B of the data area 102-1 in the L1 layer is located on the outer circumferential side, by the first offset amount (width in the radial direction of 150 μm), from the above-mentioned recording start position A of the data area 102-0 in the L0 layer. Under the recording operation for the optical disc without consideration of the second offset amount, a most outer circumferential position D' (sector number: "22D43Bh", radius: 58.00 mm) of the data area 102-1 in the L1 layer is located on the outer circumferential side, by 60 μm in the radial direction, from the above-mentioned most outer circumferential position C of the data area 102-0 in the L0 layer. In general, the radius increases as closer to the most outer circumference of the optical disc. Thus, a difference in position in the radial direction between the L0 layer and the L1 layer on the most inner circumference, which is the first offset amount (150 μm), decreases to 60 μm on the outer circumference. Therefore, as shown in FIG. 13, the recording operation for the optical disc is performed such that the actual most outer circumferential position D of the data area 102-1 in the L1 layer is located on the inner circumferential side by 210 μm (=150+60) from the position D'. In other words, the recording operation for the optical disc is performed such that the sector number of the actual most outer circumferential position D of the data area 102-1 in the L1 layer is smaller than that of the position D', by the sector number of "4711h". Incidentally, the method of converting the length in the radial direction to the sector number can be obtained experimentally, experientially, identically, or by simulation, or the like.

In the same manner, in the parallel manner, for example, the record data which is the first content data is firstly recorded from the above-mentioned recording start position A to a recording end position E (sector number: "6C7E6h", radius: 30.00 mm) of the data area 102-0 in the L0 layer. Then, it is recorded from the above-mentioned recording start position B to a recording end position F (sector number: "698BFh", radius: 29.85 mm) of the data area 102-1 in the L1 layer (refer to a gray area in FIG. 13). Thus, in the positions E and F, a difference of the second offset amount (150 μm) is obtained in the radial direction. In other words, the recording operation for the optical disc is performed such that the sector number of the recording end position F in the L1 layer is smaller than that of the recording end position E in the L0 layer, by the sector number of "2F27h". Alternatively, the record data which is the third content data is firstly recorded until a recording end position G (sector number: "EC5B9h", radius: 40.00 mm) in the L0 layer. Then, it is recorded until a recording end position H (sector number: "E8 DBFh", radius: 39.85 mm) in the L1 layer (refer to a dotted area in FIG. 13). Thus, in the positions G and H, a difference of the second offset amount (150 μm) is obtained in the radial direction. In other words, the recording operation for the optical disc is performed such that the sector number of the recording end position H in the L1 layer is smaller than that of the recording end position G in the L0 layer, by the sector number of "37FAh".

Incidentally, even in the opposite manner, the recording area becomes the same as in the parallel manner after the completion of the recording operation for the optical disc. Thus, the explanation is omitted.

As discussed in detail, according to the second embodiment, it is possible to automatically verify whether or not the determined offset amount is within the tolerance set in advance with respect to the first offset amount and the second offset amount.

Various Specific Examples of Optical Disc Targeted For Verification in Second Embodiment Next, with reference to FIG. 14 to FIG. 16, an explanation will be given to various specific examples of the optical disc in which the first offset amount OFF1 and the second offset amount OFF2 are preferably verified by the offset amount measuring apparatus which is constructed to perform the judging process as well in the second embodiment.

At first, a more detailed explanation will be given to the data structure of the two-layer type optical disc, the recording area represented by the sector number, and the recording procedure of the optical disc. FIG. 14 is a conceptual view showing one specific example of the recording area after the recording operation for the optical disc if the track pitch of the L1 layer is adjusted, in the two-layer type optical disc, in the second embodiment. FIG. 15 is a conceptual view showing one specific example of the recording area after the recording operation for the optical disc in the parallel or opposite manner, in the two-layer type optical disc, in the second embodiment. FIG. 16 is a conceptual view showing another specific example of the recording area after the recording operation for the optical disc in the parallel or opposite manner, in the two-layer type optical disc, in the second embodiment. Incidentally, in these figures, the address in the L1 layer indicates the sector number in the parallel manner.

At first, with reference to FIG. 14 and FIG. 15, one specific example of the two-layer type optical disc in the second embodiment will be discussed.

Figure 14:
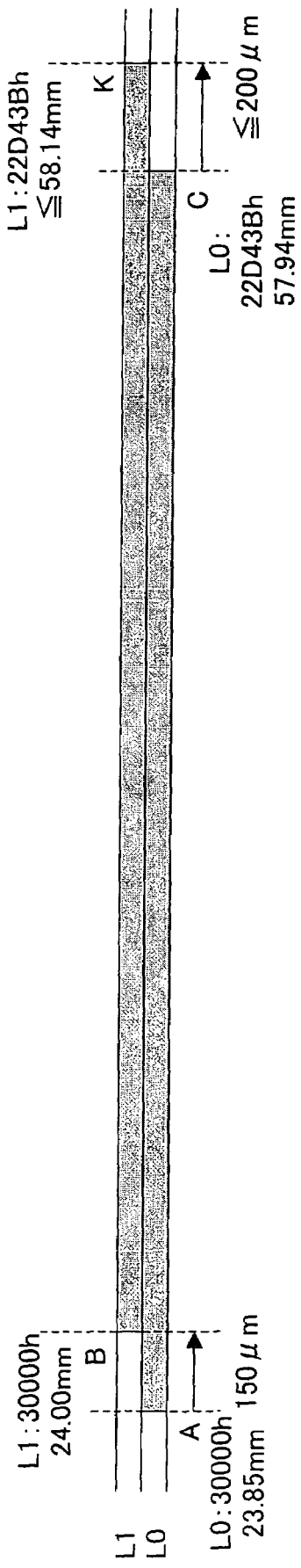
FIG. 14 is a conceptual view showing one specific example of the recording area after the recording operation for the optical disc if the track pitch of the L1 layer is adjusted, in the two-layer type optical disc, in the second embodiment.

As shown in FIG. 14, in one specific example of the optical disc in the second embodiment, the track pitch in the L1 layer is adjusted. Therefore, if the recording operation for the optical disc is performed, the most outer circumferential position of the data area 102-1 in the L1 layer is located on the outer circumferential side, by a third offset amount, from the most outer circumferential position of the data area 102-0 in the L0 layer. The "third offset amount" herein is a reference value which corresponds to the length in the radial direction and which is determined to locate the most outer circumferential position of the data area 102-1 in the L1 layer, within a predetermined range, from the most outer circumferential position of the data area 102-0 in the L0 layer when the record operation for the optical disc is performed, by adjusting the ratio or difference of the track pitch in the L0 layer and the L1 layer with respect to the optical disc. More specifically, the recording operation is performed with respect to the optical disc in which the track pitch in the L1 layer is adjusted in the second embodiment, and it is constructed to locate a most outer circumferential position K (sector number: "22D43Bh", radius: 58.14 mm) of the data area 102-1 in the L1 layer, on the outer circumferential side, by 200 μm as the third offset amount in the radial direction, from the above-mentioned most outer circumferential position C of the data area 102-0 in the L0 layer which has the same sector number as that of the most outer circumferential position K.

Incidentally, only the track pitch in the L1 layer may be adjusted, or the ratio or difference of the track pitches in the L0 layer and the L1 layer may be adjusted.

Figure 15:
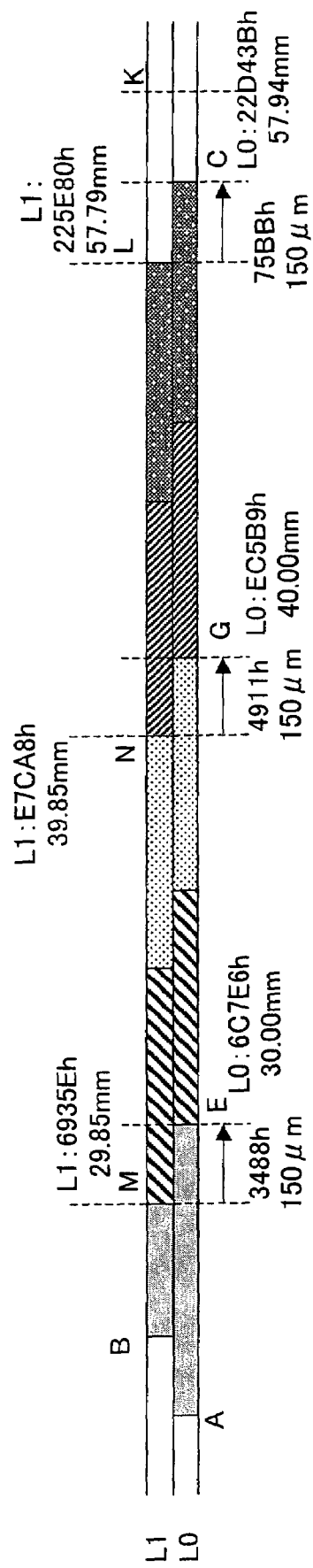
FIG. 15 is a conceptual view showing one specific example of the recording area after the recording operation for the optical disc in the parallel or opposite manner, in the two-layer type optical disc, in the second embodiment.

Therefore, as shown in FIG. 15, according to one specific example of the optical disc, it is constructed to always locate the recording end position of the data area 102-1 in the L1 layer, on the inner circumferential side, by the second offset amount (width in the radial direction of 150 μm), from the recording end position of the data area 102-0 in the L0 layer, in the recording operation for the optical disc in which the record data is recorded alternately into the L0 layer and the L1 layer. Thus, the actual recording end position of the data area 102-1 in the L1 layer is determined, including the third offset amount, in addition to the second offset amount. Incidentally, the method of determining the recording end position in view of the third offset amount can be obtained experimentally, experientially, identically, or by simulation, or the like.

More specifically, the recording operation for the optical disc is performed such that an actual most outer circumferential position L of the data area 102-1 in the L1 layer is located on the inner circumferential side by 350 μm (=200+ 150), from the position K. In other words, the recording operation for the optical disc is performed such that the sector number of the actual most outer circumferential position L of the data area 102-1 in the L1 layer is smaller than that of the position K, by the sector number of "75BBh". As a result, the sector number of the most outer circumferential position L of the data area 102-1 in the L1 layer is "225E80h", and the radius thereof is 57.79 mm. As compared to the one specific example of the two-layer type optical disc in the first embodiment of the information recording medium of the present invention discussed with reference to FIG. 8, it is seen that the sector number is smaller, to the extent that the track pitch in the L1 layer is large.

In the same manner, in the parallel manner, for example, the record data which is the first content data is firstly recorded from the above-mentioned recording start position A to the above-mentioned recording end position E of the data area 102-0 in the L0 layer. Then, it is recorded from the above-mentioned recording start position B to a recording end position M (sector number: "6935Eh", radius: 29.85 mm)

of the data area 102-1 in the L1 layer (refer to a gray area in FIG. 15). Thus, in the radial positions of the positions E and M, a difference of the second offset amount (150 μm) is obtained. In other words, the recording operation for the optical disc has been performed such that the sector number of the recording end position F in the L1 layer is smaller than that of the recording end position E in the L0 layer, by the sector number of "3488h". Alternatively, the record data which is the third content data is firstly recorded until the above-mentioned recording end position G in the L0 layer. Then, it is recorded until a recording end position N (sector number: "E7CA8h", radius: 39.85 mm) in the L1 layer (refer to a dotted area in FIG. 15). Thus, in the radial positions of the positions G and N, a difference of the second offset amount (150 μm) is obtained. In other words, the recording operation for the optical disc has been performed such that the sector number of the recording end position N in the L1 layer is smaller than that of the recording end position G in the L0 layer, by the sector number of "4911h".

Incidentally, even in the opposite manner, the recording area becomes the same as in the parallel manner after the completion of the recording operation for the optical disc. Thus, the explanation is omitted.

Next, with reference to FIG. 16, as well as FIG. 15 described above, as occasion demands, another specific example of the two-layer type optical disc in the second embodiment will be discussed.

Figure 16:
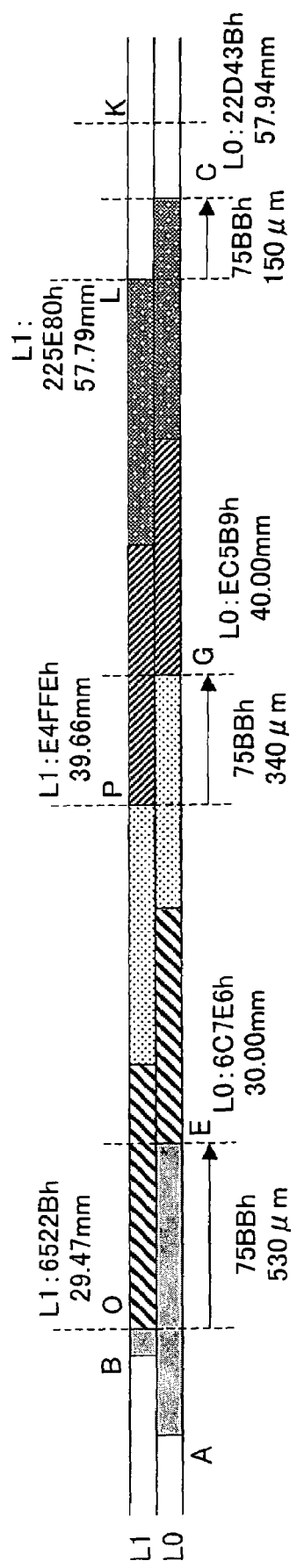
FIG. 16 is a conceptual view showing another specific example of the recording area after the recording operation for the optical disc in the parallel or opposite manner, in the two-layer type optical disc, in the second embodiment.

As shown in FIG. 16, the track pitch in the L1 layer is controlled in substantially the same manner as the one specific example discussed in FIG. 15.

Therefore, as shown in FIG. 16, according to another specific example of the two-layer type optical disc in the second embodiment, it is constructed to make the sector number of the recording end position of the data area 102-1 in the L1 layer, always smaller than that of the recording end position of the data area 102-0 in the L0 layer, by the second offset amount (by the constant sector number), in the recording operation for the optical disc in which the record data is recorded alternately into the L0 layer and the L1 layer. Incidentally, the method of determining the constant sector number which is the second offset amount can be obtained experimentally, experientially, identically, or by simulation, or the like, in substantially the same manner as the one specific example discussed in FIG. 15. Moreover, according to another specific example, it is only necessary to record the record data in accordance with the pre-format address, such as the sector number. Thus, there is also such an advantage that the recording procedure itself is simplified.

More specifically, the recording operation for the optical disc is performed such that the sector number of the actual most outer circumferential position D of the data area 102-1 in the L1 layer is smaller than that of the above-mentioned most outer circumferential position C of the data area 102-0 in the L0 layer, by the sector number of "75BBh". As described above, it is obvious that if the constant sector number determined at the most outer circumferential position is set as the second offset amount, the width in the radial direction corresponding to the constant sector number increases as closer to the inner circumferential side with a smaller radius.

In the same manner, in the parallel manner, for example, the record data which is the first content data is firstly recorded from the above-mentioned recording start position A to the above-mentioned recording end position E of the data area 102-0 in the L0 layer. Then, it is recorded from the above-mentioned recording start position B to a recording end position O (sector number: "6522Bh", radius: 29.47 mm) of the data area 102-1 in the L1 layer (refer to a gray area in FIG. 16). In other words, the recording operation for the optical disc is performed such that the sector number of the recording end position O in the L1 layer is smaller than that of the recording end position E in the L0 layer, by the sector number of "75BBh". Thus, in the radial positions of the positions E and O, a difference of 530 μm which is larger than the second offset amount (150 μm) is obtained. Alternatively, the record data which is the third content data is firstly recorded until the above-mentioned recording end position G in the L0 layer. Then, it is recorded until a recording end position P (sector number: "E4FFEh", radius: 39.66 mm) in the L1 layer (refer to a dotted area in FIG. 16). In other words, the recording operation for the optical disc is performed such that the sector number of the recording end position P in the L1 layer is smaller than that of the recording end position G in the L0 layer, by the sector number of "75BBh". Thus, in the radial positions of the positions G and P, a difference of 340 μm which is larger than the second offset amount (150 μm) is obtained.

Incidentally, even in the opposite manner, the recording area becomes the same as in the parallel manner after the completion of the recording operation for the optical disc. Thus, the explanation is omitted.

Third Embodiment

Figure 17:
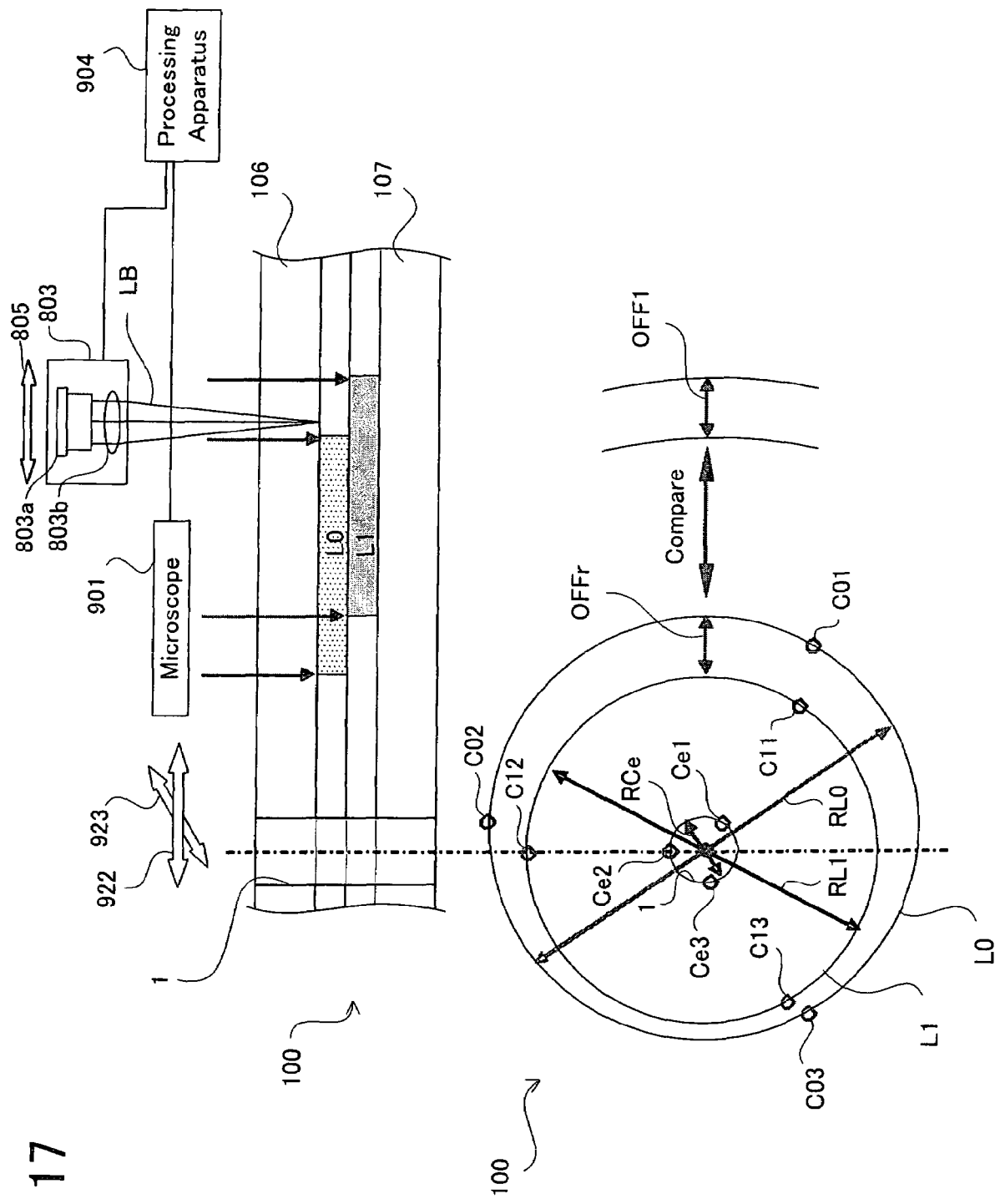
FIG. 17 is a conceptual view schematically showing an offset amount measuring apparatus and method in a third embodiment of the present invention.
Figure 18:
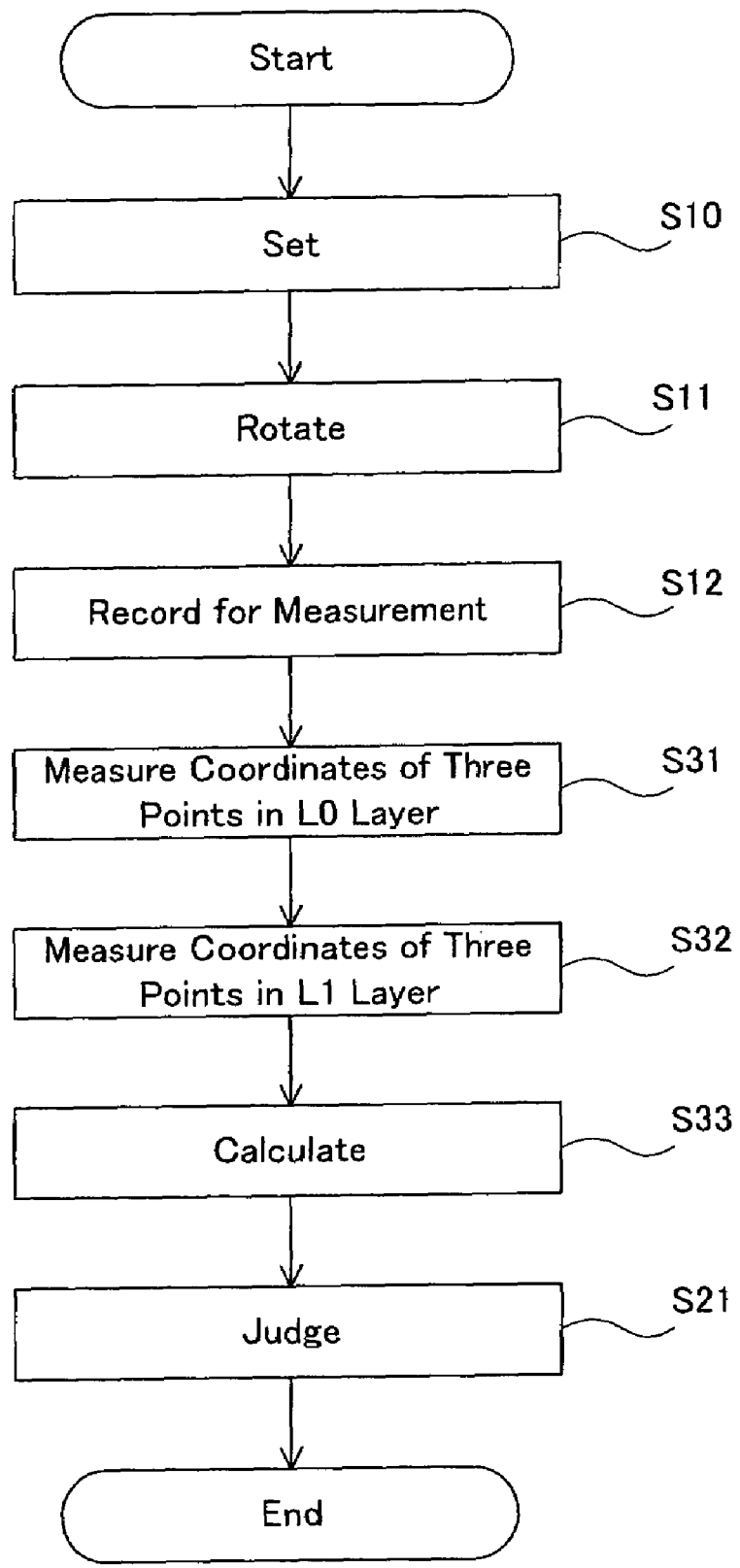
FIG. 18 is a flowchart of the offset amount measuring method in the third embodiment.

A third embodiment according to the offset amount measuring method and apparatus of the present invention will be explained hereinafter with reference to FIG. 17 and FIG. 18. FIG. 17 is a conceptual view schematically showing an offset amount measuring apparatus and method in the third embodiment. FIG. 18 is a flowchart of the offset amount measuring method in the third embodiment. Incidentally, the same constitutional elements and the same processes as those in the first embodiment, explained with reference to FIG. 1 to FIG. 8 or as those in the second embodiment, explained with reference to FIG. 9 to FIG. 13, carry the same reference numerals, and the explanation thereof are omitted, as occasion demands.

As shown in the schematic block diagram on the upper side of FIG. 17, the offset amount measuring apparatus in the embodiment is provided with: a microscope 901; a recording apparatus 803 for measurement; and a processing apparatus 904.

The microscope 901 functions as one example of the "first detecting device" and the "second detecting device" of the present invention, and moreover, as one example of the "two-dimensional length measuring apparatus". The microscope 901 can be displaced two-dimensionally as in arrows 922 and 923 along the recording surface of the optical disc 100, on the basis of the center hole 1 of the optical disc 100. Moreover, the microscope 901 can be selectively focused on the L0 layer or the L1 layer, under the control of the processing apparatus 904. The microscope is provided with a CCD (Charged Coupled Device) or a two-dimensional image pickup device, such as a solid image pickup device and a light microscope.

In the third embodiment, as in the optical disc in the first embodiment, an optical disc of a type without setting the first or second offset amount may be a measurement target, however, here, an optical disc of a type with the first or second offset amount set is a measurement target, as in the optical disc in the second embodiment. Then, the processing apparatus 904 determines the offset amount OFFr from the coordinates of a plurality of points on the track on which the information for measurement is recorded, as explained next, and verifies whether or not the first or second offset amount is appropriate.

As shown in FIG. 18, the step S10 to the step S12 are performed, as shown in FIG. 6 to FIG. 8 in the first embodiment, with respect to the optical disc in which the first and second offset amounts are set for the offset countermeasure (the step S10 to the step S12).

After the step S12, an image is taken by the microscope 901 shown in FIG. 17, to thereby measure the coordinates of three points C01, C02, and C03 on the track 10 in the L0 layer, which is shown in a plan view on the lower side of FIG. 17 and which make a circle with a radius of RL0 as being one example of the first border position (step S31). Such detection is also performed on the basis of a difference in reflectance between a first recorded area in which the information for measurement is already recorded and a first unrecorded area in which the information for measurement is unrecorded, in the L0 layer. At this time, it is possible to detect the coordinates of the three points C01, C02, and C03, highly accurately, by using the high powered microscope 901 because it can be displaced two-dimensionally as in the arrows 922 and 923 along the recording surface of the optical disc 100, on the basis of the center hole 1. The information which indicates the coordinates of the three points C01, C02, and C03, detected by the microscope 901, is inputted to the processing apparatus 904.

After that, the coordinates of three points C11, C12, and C13 on the track 10 in the L0 layer, which make a circle with a radius of RL0 as being one example of the border position are measured (step S32). Before or after this, the coordinates of three points Ce1, Ce2, and Ce3 on a track in the vicinity of the center hole 1 are also measured in the same manner.

After that, the offset amount is determined by the processing apparatus 904, on the basis of the coordinates of the three points C01, C02, and C03 related to one example of the "first border position" and the coordinates of three points C11, C12, and C13 related to one example of the "second border position", which are detected in the above manner, as one example of the "determining process" of the present invention (step S33). More specifically, the central coordinates in the L0 layer and the L1 layer are calculated from the above coordinates, and moreover, the radius at each point is calculated. The offset amount OFFs is calculated from a difference between the radius in the L0 layer and the radius in the L1 layer, or the like. In view of such calculation, it is preferable that a plurality of points related to one example of the first or second border position are located at predetermined addresses in the vicinity of the start end of the data area, in the middle of the data area, in the vicinity of the end of the data area, or the like, for example. Incidentally, in any cases, if the detection and the calculation are not performed for all the tracks but for the plurality of points which are discrete, it is useful in practice to save a time and reduce labor. Moreover, it is also possible to perform the verification by extraction for each production lot.

After that, it is judged by the judging process whether or not the offset amount OFFr calculated in the step S33 (i.e. an experimental value) is within the tolerance set in advance for the first offset amount OFF1. Alternatively, it is judged whether or not the offset amount OFFr calculated in the step S33 (i.e. an experimental value) is within the tolerance set in advance for the second offset amount OFF2 (step S21).

As discussed in detail, according to the second embodiment, it is possible to automatically verify whether or not the determined offset amount is within the tolerance set in advance with respect to the first offset amount and the second offset amount.

Embodiment of Information Recording Apparatus

Figure 19:
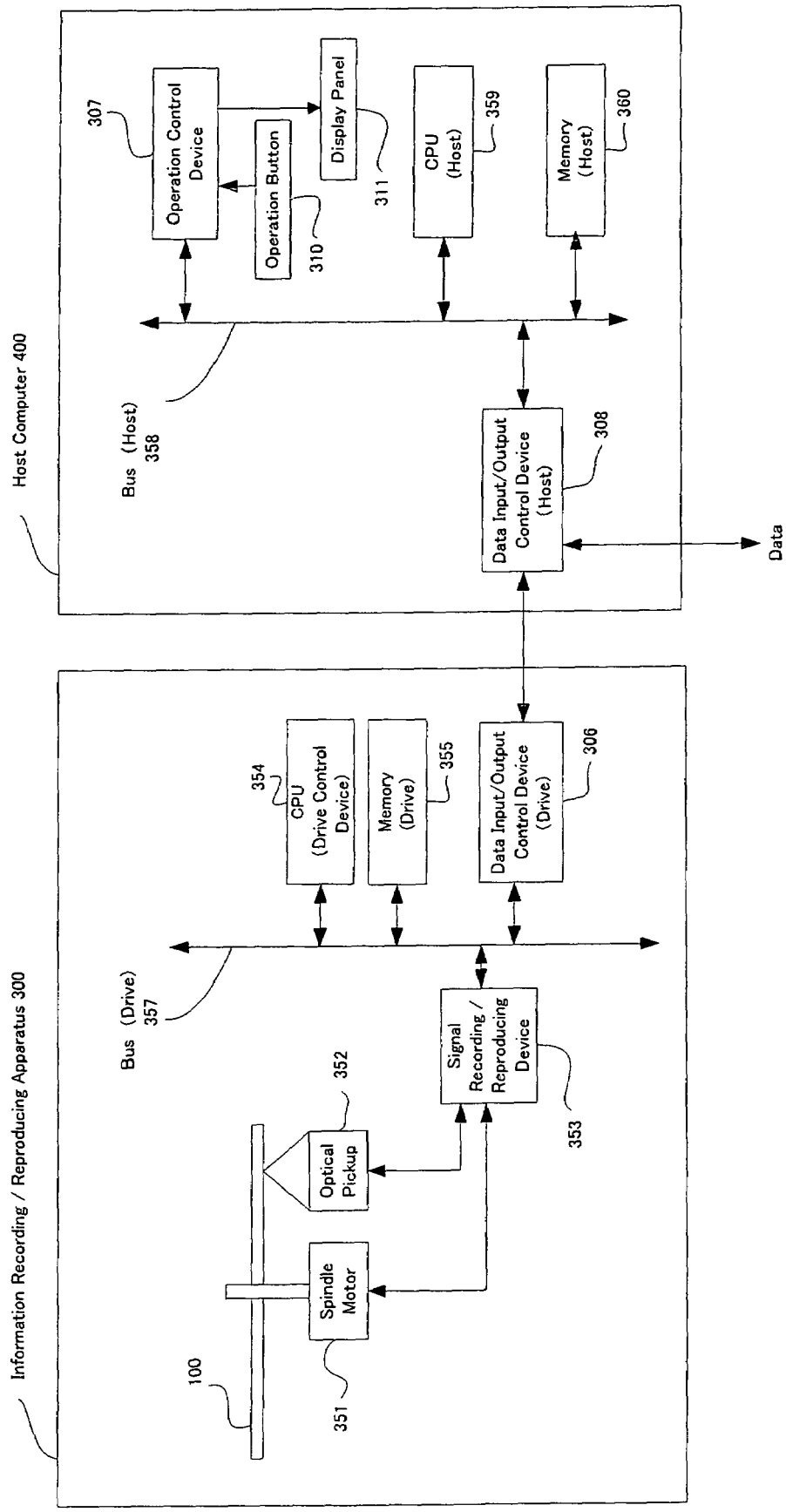
FIG. 19 is a block diagram showing an information recording/reproducing apparatus in an embodiment of the information recording apparatus of the present invention, and a host computer.

Next, with reference to FIG. 19, the basic structure of an information/reproducing apparatus 300 in the embodiment of the information recording apparatus of the present invention, and a host computer 400 will be discussed. Particularly in the embodiment, the information recording apparatus of the present invention is applied to an information recording/reproducing apparatus for an optical disc. FIG. 19 is a block diagram showing the basic structure of the information recording/reproducing apparatus in the embodiment of the information recording apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 19, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 354 for the drive.

The information recording/reproducing apparatus 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation control device 307; an operation button 310; a display panel 311; and a data input/output control device 308.

In particular, the communicating device of the present invention may be constructed by including the information recording/reproducing apparatus 300 and the host computer 400 in the same housing, or by using the CPU (drive control device) 354, the data input/output control device 306, and the bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for an OPC (Optimum Power Control) pattern, together with a not-illustrated timing generator or the like, under the CPU 305, upon an OPC process. In particular, the signal recording/reproducing device 353 constitutes one example of the "writing device" and the "obtaining device" of the present invention, together with the optical pickup 352.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire information recording/reproducing apparatus 300 by giving an instruction to various controlling devices. Normally, software or firmware for operating the CPU 354 is stored in the memory 355.

The data input/output control device 306 controls the input/output of the data from the exterior with respect to the information recording/reproducing apparatus 300, to thereby perform storage to and export from the data buffer on the memory 355. A drive control command issued from the external host computer 400 (hereinafter referred to as a "host", as occasion demands) connected to the information recording/reproducing apparatus 300 through an interface, such as a SCSI and an ATAPI, is transmitted to the CPU 354 through the data input/output control device 306. Moreover, the record/reproduction data is also transmitted and received with respect to the host computer 400 through the data input/output control device 306, in the same manner.

The operation control device 307 receives an operation instruction and performs display with respect to the host computer 400, and transmits an instruction by the operation button 310, such as an instruction to record or reproduce, to the CPU 359. The CPU 359 may transmit a control command to the information recording/reproducing apparatus 300, through the data input/output control device 308, on the basis of instruction information from the operation control device 307, to thereby control the entire information recording/reproducing apparatus 300. In the same manner, the CPU 359 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 359 can output the operational state of the information recording/reproducing apparatus 300 to the display panel 310, such as a fluorescent tube and an LCD, through the operation control device 307.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television.

The operation as the recorder equipment is performed by executing a program stored in the memory 360, on the CPU 359. Moreover, in another specific example, the information recording /reproducing apparatus 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer controls the disc drive.

On the information recording/reproducing apparatus 300 in the embodiment, information about the ratio or difference of the track pitch described above may be read from a first management area on the optical disc 100 in which the information is recorded, to thereby certainly perform the recording or reproduction operation. Alternatively, information about the first offset amount described above may be read from a second management area on the optical disc 100 in which the information is recorded, to thereby certainly perform the recording or reproduction operation.

In the embodiments, a write-once or rewritable type optical disc, such as a two-layer type DVD-R/RW, is explained, as one specific example of the information recording medium. The present invention, however, can be applied to a multiple layer type optical disc, such as a three-layer type. Moreover, it can be applied to a large-capacity recording medium, such as a disc which uses blue laser for recording/reproduction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-366888 filed on Dec. 17, 2004 including the specification, claims, drawings and summary is incorporated herein by reference in its entirety.

What is claimed is:

1. An offset amount measuring method of measuring an offset amount, which is a shift amount in a radial direction between radial positions on first and second recording tracks, the radial positions being associated with each other by a pre-format address given in advance to the first and second recording tracks, in an information recording medium comprising at least: a disc-shaped first recording layer in which the first recording track is formed to record therein record information; and a disc-shaped second recording layer in which the second recording track is formed to record therein the record information in a direction equal to or opposite to that in the first recording track of the first recording layer, said offset amount measuring method comprising:

a recording process for measurement (i) of recording information for measurement, into the first recording track, by a predetermined section or by a predetermined length, from one measurement reference position which is specified by the pre-format address, and (ii) of recording the information for measurement, into the second recording track, by the predetermined section or by the predetermined length, from or toward a measurement correspondence position, which is associated with the one measurement reference position by the pre-format address;

a first detecting process of detecting a first border position which is a border of a first recorded area in which the information for measurement is recorded and a first unrecorded area in which the information for measurement is unrecorded in the first recording track, on the basis of a difference in reflectance between the first recorded area and the first unrecorded area, with a central axis of said information recording medium as a reference;

a second detecting process of detecting a second border position which is a border of a second recorded area in which the information for measurement is recorded and a second unrecorded area in which the information for measurement is unrecorded in the second recording track, on the basis of a difference in reflectance between the second recorded area and the second unrecorded area, with the central axis as a reference; and a determining process of determining the offset amount, on the basis of the detected first and second border positions.

2. The offset amount measuring method according to claim 1, wherein the first and second detecting processes detect the first and second border positions, respectively, by a light microscope which is located opposite to the first and second recording layers and which is fixed with respect to the central axis while said information recording medium is rotated around the central axis.

3. The offset amount measuring method according to claim 1, wherein the first and second detecting processes detect coordinates based on the central axis of a plurality of points which exist in the first and second border positions, which is specified by the pre-format address, by using a two-dimensional length measuring apparatus which is located opposite to the first and second recording layers and which can be displaced in parallel with the first and second recording layers.

4. The offset amount measuring method according to claim 1, wherein a second place which is a reference of the pre-format address to indicate a start position of a data area in which the record information can be recorded in the second recording track is located on an outer circumferential side, by at least a first offset amount set in advance, from a first place which is a reference of the pre-format address to indicate a start position of a data area in which the record information can be recorded in the first recording track, and said offset amount measuring method further comprises a judging process of judging whether or not the determined offset amount is within tolerance set in advance with respect to the first offset amount.

5. The offset amount measuring method according to claim 4, wherein the first offset amount is set to be equal to or greater than an eccentric amount in the first recording layer and the second recording layer.

6. The offset amount measuring method according to claim 4, wherein the first recording track and the second recording track are constructed such that a ratio of a track pitch of the second recording track to a track pitch of the first recording track as a reference has a predetermined value less than 1.

7. The offset amount measuring method according to claim 4, wherein the first recording track and the second recording track are constructed such that a difference of a track pitch of the second recording track to a track pitch of the first recording track as a reference has a predetermined negative value.

8. The offset amount measuring method according to claim 4, wherein said information recording medium further comprises a second management area in which information about the first offset amount is recorded.

9. The offset amount measuring method according to claim 1, wherein a second place which is a reference of the pre-format address to indicate a start position of a data area in which the record information can be recorded in the second recording track is located on an inner circumferential side, by at least a first offset amount set in advance, from a first place which is a reference of the pre-format address to indicate an end position of a data area in which the record information can be recorded in the first recording track, and said offset amount measuring method further comprises a judging process of judging whether or not the determined offset amount is within tolerance set in advance with respect to the first offset amount.

10. The offset amount measuring method according to claim 9, wherein the first offset amount is set to be equal to or greater than an eccentric amount in the first recording layer and the second recording layer.

11. The offset amount measuring method according to claim 9, wherein the first recording track and the second recording track are constructed such that a ratio of a track pitch of the second recording track to a track pitch of the first recording track as a reference has a predetermined value less than 1.

12. The offset amount measuring method according to claim 11, wherein the ratio of the track pitch of the second recording track is set such that an outer circumferential end of the data area in the second recording track is located on an inner circumferential side, by at least the first offset amount, from an outer circumferential end of the data area in the first recording track.

13. The offset amount measuring method according to claim 11, wherein said information recording medium further comprises a first management area in which information about the ratio of the track pitch of the second recording track is recorded.

14. The offset amount measuring method according to claim 9, wherein the first recording track and the second recording track are constructed such that a difference of a track pitch of the second recording track to a track pitch of the first recording track as a reference has a predetermined negative value.

15. The offset amount measuring method according to claim 14, wherein the difference of the track pitch of the second recording track is set such that an outer circumferential end of the data area in the second recording track is located on an inner circumferential side, by at least the first offset amount, from an outer circumferential end of the data area in the first recording track.

16. The offset amount measuring method according to claim 14, wherein said information recording medium further comprises a first management area in which information about the difference of the track pitch of the second recording track is recorded.

17. The offset amount measuring method according to claim 9, wherein said information recording medium further comprises a second management area in which information about the first offset amount is recorded.

18. An offset amount measuring apparatus for measuring an offset amount, which is a shift amount in a radial direction between radial positions on first and second recording tracks, the radial positions being associated with each other by a pre-format address given in advance to the first and second recording tracks, in an information recording medium comprising at least: a disc-shaped first recording layer in which the first recording track is formed to record therein record information; and a disc-shaped second recording layer in which the second recording track is formed to record therein the record information in a direction equal to or opposite to that in the first recording track of the first recording layer, said offset amount measuring apparatus comprising:

a recording device (i) for recording information for measurement, into the first recording track, by a predetermined section or by a predetermined length, from one measurement reference position which is specified by the pre-format address, and (ii) for recording the information for measurement, into the second recording track, by the predetermined section or by the predetermined length, from or toward a measurement correspondence position, which is associated with the one measurement reference position by the pre-format address;

a first detecting device for detecting a first border position which is a border of a first recorded area in which the information for measurement is recorded and a first unrecorded area in which the information for measurement is unrecorded in the first recording track, on the basis of a difference in reflectance between the first recorded area and the first unrecorded area, with a central axis of said information recording medium as a reference;

a second detecting device for detecting a second border position which is a border of a second recorded area in which the information for measurement is recorded and a second unrecorded area in which the information for measurement is unrecorded in the second recording track, on the basis of a difference in reflectance between the second recorded area and the second unrecorded area, with the central axis as a reference; and a determining device for determining the offset amount, on the basis of the detected first and second border positions.

* * * * *